United States Patent
Ikadai et al.

(10) Patent No.: US 12,227,445 B2
(45) Date of Patent: Feb. 18, 2025

(54) GLASS PLATE SUITABLE FOR IMAGE DISPLAY DEVICE

(71) Applicant: Nippon Sheet Glass Company, Limited, Tokyo (JP)

(72) Inventors: Masahiro Ikadai, Mie (JP); Shinji Oizumi, Kanagawa (JP); Junichi Kiriyama, Tokyo (JP); Tsutomu Tanoue, Tokyo (JP)

(73) Assignee: NIPPON SHEET GLASS COMPANY, LIMITED, Tokyo (JP)

( * ) Notice: Subject to any disclaimer, the term of this patent is extended or adjusted under 35 U.S.C. 154(b) by 1012 days.

(21) Appl. No.: 17/258,060

(22) PCT Filed: Jul. 1, 2019

(86) PCT No.: PCT/JP2019/026130
§ 371 (c)(1),
(2) Date: Jan. 5, 2021

(87) PCT Pub. No.: WO2020/013012
PCT Pub. Date: Jan. 16, 2020

(65) Prior Publication Data
US 2021/0230052 A1    Jul. 29, 2021

(30) Foreign Application Priority Data

Jul. 9, 2018   (JP) .................................. 2018-130000
Feb. 1, 2019   (JP) .................................. 2019-017246
Apr. 23, 2019  (JP) .................................. 2019-081614

(51) Int. Cl.
C03C 15/00   (2006.01)
G02B 1/118   (2015.01)
(Continued)

(52) U.S. Cl.
CPC .............. *C03C 15/00* (2013.01); *G02B 1/118* (2013.01); *G02F 1/1333* (2013.01);
(Continued)

(58) Field of Classification Search
None
See application file for complete search history.

(56) References Cited

U.S. PATENT DOCUMENTS

2003/0228759 A1   12/2003   Uehara et al.
2006/0024478 A1   2/2006    D'Urso et al.
(Continued)

FOREIGN PATENT DOCUMENTS

JP   2016136232   7/2016
JP   2017510531   4/2017
(Continued)

OTHER PUBLICATIONS

Extended European Search Report issued for European Patent Application No. 19834003.6, dated Mar. 24, 2022, 6 pages.
(Continued)

*Primary Examiner* — Eli D. Strah
(74) *Attorney, Agent, or Firm* — HSML P.C.

(57) ABSTRACT

The present disclosure provides a glass plate including a main surface having a plurality of minute deformed portions which are recesses or projections, wherein, where an average value of lengths of two sides adjacent to each other of a minimum quadrilateral with four right angles surrounding each minute deformed portion is defined as a dimension, an average value of the dimensions of the plurality of deformed portions is 3.2 to 35.5 μm. The glass plate satisfies a condition a1 that a ratio of deformed portions A1 having the dimensions of 0.5 to 3.0 μm with respect to the plurality of deformed portions in terms of number is less than 5%, and/or a condition d1 that a coefficient of variation of the
(Continued)

dimensions is 40% or less. This glass plate is suitable for suppressing sparkle and is highly practical, when disposed on an image display device.

11 Claims, 12 Drawing Sheets

(51) Int. Cl.
*G02F 1/1333* (2006.01)
*G02F 1/1335* (2006.01)

(52) U.S. Cl.
CPC .. *G02F 1/133302* (2021.01); *G02F 1/133502* (2013.01); *G02F 2202/09* (2013.01)

(56) References Cited

U.S. PATENT DOCUMENTS

| | | | |
|---|---|---|---|
| 2012/0134024 A1* | 5/2012 | Lander | C03C 15/02 |
| | | | 359/599 |
| 2013/0182328 A1 | 7/2013 | Stewart et al. | |
| 2017/0276995 A1 | 9/2017 | Sato et al. | |
| 2018/0162091 A1* | 6/2018 | Takeda | G02B 1/113 |

FOREIGN PATENT DOCUMENTS

| | | |
|---|---|---|
| JP | 2017523111 | 8/2017 |
| JP | 2018018378 | 2/2018 |
| JP | 2018511547 | 4/2018 |
| KR | 101470306 B1 | 12/2014 |
| WO | 2014112297 | 7/2014 |
| WO | 2015100056 | 7/2015 |
| WO | 2016005216 | 1/2016 |
| WO | 2016138051 | 9/2016 |
| WO | 2016186935 | 11/2016 |
| WO | 2016187194 | 11/2016 |

OTHER PUBLICATIONS

International Search Report and Written Opinion issued for International Patent Application No. PCT/JP2019/026130, Date of mailing: Oct. 1, 2019, 12 pages including English translation of Search Report.

* cited by examiner

GLASS PLATE SUITABLE FOR IMAGE DISPLAY DEVICE

TECHNICAL FIELD

The present invention relates to a glass plate, and in particular, a glass plate suitable for use in combination with an image display device.

BACKGROUND ART

A glass plate disposed on an image display side of an image display device typified by a liquid crystal display device may be imparted with an antiglare function for suppressing specular reflection of ambient light. The antiglare function is provided by minute deformed portions, specifically, minute recesses/projections formed on a surface of the glass plate. The antiglare function is evaluated using gloss as an index such that, the smaller the value of gloss is, the higher the antiglare function is. On the other hand, light scattering caused by the minute recesses/projections is evaluated by haze. In order not to impair clarity of a displayed image, haze is desired to be small. In general, the minute recesses/projections are formed on the surface of the glass plate by sandblasting, etching, or a combination thereof.

With enhancement of the definition of the image display device, a phenomenon called sparkle has become a problem. The sparkle is a bright spot that occurs depending on a relationship between minute recesses/projections on a main surface of antiglare glass imparted with the antiglare function and a pixel size of the image display device. The sparkle is more likely to be recognized as irregular light fluctuation when, in particular, a user's viewing point moves relative to the image display device, but is observed even when a user's viewing point is at rest.

Patent Literature 1 discloses a glass plate having a main surface that includes a base surface with an arithmetic mean roughness Ra of 0.01 to 0.1 μm and a mean width RSm of 1 to 20 μm. The main surface has recesses called dents which are distributed on the base surface and which have diameters of 3 to 20 μm and depths of 0.2 to 1.5 μm. The main surface is formed by applying etching after sandblasting. Patent Literature 1 discloses that working examples of the above glass suppressed sparkle.

Patent Literature 2 discloses a glass plate having a main surface with an arithmetic mean roughness Ra of 0.02 to 0.4 μm and a mean width RSm of 5 to 30 μm. Minute recesses/projections on the main surface are formed by etching using an etchant having an adjusted composition, without performing a pretreatment by sandblasting. Patent Literature 2 discloses that working examples of the above glass plate suppressed sparkle.

Patent Literature 3 discloses a glass plate in which a variation of gloss with respect to the variation of a surface roughness RMS, i.e., ΔGloss/ΔRMS, is set to −800 or smaller. This glass plate is manufactured by etching involving pre-etching, in other words, two-stage etching. According to the section of Examples in Patent Literature 3, sparkle is more suppressed as ΔGloss/ΔRMS is reduced.

CITATION LIST

Patent Literature

Patent Literature 1: JP 2016-136232 A
Patent Literature 2: JP 2017-523111 A
Patent Literature 3: WO 2014/112297

SUMMARY OF INVENTION

Technical Problem

As sparkle is suppressed, it becomes more difficult to control both gloss and haze to be small values. For example, in Patent Literature 2, Comparative Example 4 in which sparkle is not suppressed indicates that gloss is 75% and haze is 3.0%, whereas Example 8 in which sparkle is suppressed indicates that gloss is 75% and haze is 13.6%, and thus haze is about 10% higher with the same gloss. Also in Patent Literature 3, gloss in Examples 1 to 6 in which sparkle is suppressed is greater than gloss in Examples 7 to 10 in which sparkle is not suppressed and haze is in almost the same range. From the above first viewpoint, it is desired to provide a glass plate with minute recesses/projections that is suitable for appropriately controlling gloss and haze while suppressing sparkle.

A glass plate used in combination with an image display device may be used as a touch panel. It is also required to provide a favorable operation feeling to a user on the surface of the touch panel. From the above second viewpoint, it is desired to provide a glass plate with minute recesses/projections that is suitable for providing a favorable operation feeling to a user while suppressing sparkle.

In conventional minute recesses/projections suitable for suppressing sparkle, the sizes and the positions of recesses and projections are basically irregular, and therefore it is not easy to precisely reproduce the minute recesses/projections in mass production. Meanwhile, according to studies by the present inventors, unnatural reflected light, more specifically, unevenness of reflection light is sometimes observed from minute recesses/projections having improved regularity in size and position. From the above third viewpoint, it is desired to provide a glass plate with minute recesses/projections that is suitable for suppressing sparkle and reducing unevenness of reflected light occurring from the glass plate and has high reproducibility in mass production.

Conventionally, the shapes of minute recesses/projections formed on a main surface of a glass plate by causing the main surface to partially recede through etching or the like have been limited to a circle, an ellipse, a polygon of which an internal angle is an obtuse angle or smaller, or a shape that can be approximated into any of these shapes, as seen from a direction perpendicular to the main surface. In addition, it is general that the shapes of the minute recesses/projections distributed on the main surface are similar to each other. Therefore, the degree of freedom in designing of the main surface is low, and this is a factor that makes it difficult to control other various properties, e.g., gloss and haze, of the glass plate in which sparkle is suppressed. From the above fourth viewpoint, it is desired to provide a glass plate that is suitable for suppressing sparkle and has a high degree of freedom in designing.

It is an object of the present invention to provide a glass plate that is suitable for suppressing sparkle and is highly practical, from at least one of the viewpoints described above.

Solution to Problem

According to a first aspect based on the first viewpoint, the present invention provides a glass plate including a main surface having a plurality of minute deformed portions, and the plurality of minute deformed portions are a plurality of recesses or a plurality of projections. Where an average value of lengths of two sides adjacent to each other of a minimum quadrilateral with four right angles, or a minimum square or rectangle, surrounding each minute deformed portion as observed from a direction perpendicular to the main surface is defined as a dimension of the minute deformed portion, an average value of the dimensions of the plurality of minute deformed portions is 3.2 μm to 35.5 μm.

Further, at least one of the following conditions is satisfied:
- a condition a1 that a ratio of minute deformed portions A1 having the dimensions of 0.5 μm to 3.0 μm with respect to the plurality of minute deformed portions in terms of number is less than 5%; and
- a condition d1 that a coefficient of variation of the dimensions of the plurality of minute deformed portions is 40% or less.

According to a second aspect based on the second viewpoint, the present invention provides a glass plate including a main surface having a plurality of minute deformed portions, and the plurality of minute deformed portions are a plurality of projections. Where an average value of lengths of two sides adjacent to each other of a minimum quadrilateral with four right angles surrounding each minute deformed portion as observed from a direction perpendicular to the main surface is defined as a dimension of the minute deformed portion, an average value of the dimensions of the plurality of minute deformed portions is 3.2 μm to 35.5 μm.

According to a third aspect based on the third viewpoint, the present invention provides a glass plate including a main surface having a plurality of minute deformed portions, and the plurality of minute deformed portions are a plurality of recesses or a plurality of projections. Where an average value of lengths of two sides adjacent to each other of a minimum quadrilateral with four right angles surrounding each minute deformed portion as observed from a direction perpendicular to the main surface is defined as a dimension of the minute deformed portion, an average value of the dimensions of the plurality of minute deformed portions is 3.2 μm to 35.5 μm.

Further, 3 to 30 bright spots are observed on a 2-dimensional Fourier transform image of a processed image having been subjected to binarization processing A for discriminating the plurality of minute deformed portions from their surrounding region in a 200 μm square region on the main surface observed from the above direction, or one bright spot is observed on the 2-dimensional Fourier transform image of the processed image having been subjected to the binarization processing A and two or more bright spots are observed on a 2-dimensional Fourier transform image of a processed image having been subjected to binarization processing B instead of the binarization processing A. Here, the binarization processing A is binarization processing performed with an image divided into pixels of 256×256, and the binarization processing B is binarization processing performed with an image divided into pixels of 65536×65536.

A 2-dimensional Fourier transform image can be obtained from a processed image obtained by dividing an image in each of the horizontal and vertical directions into a predetermined number of pixels and performing binarization processing of the pixels so as to discriminate the minute deformed portions and the surrounding region from each other. As described later, the binarization processing A or B may be performed for a region on the main surface where there are 80 to 150 minute deformed portions having dimensions of 0.5 μm or greater, instead of a 200 μm square region on the main surface, and then the number of bright spots may be counted on the basis of a 2-dimensional Fourier transform image of the processed image. Also in this case, it is preferable that 3 to 30 bright spots are observed on the 2-dimensional Fourier transform image of the processed image having been subjected to the binarization processing A, or one bright spot is observed on the 2-dimensional Fourier transform image of the processed image having been subjected to the binarization processing A and two or more bright spots are observed on the 2-dimensional Fourier transform image of the processed image having been subjected to the binarization processing B instead of the binarization processing A. The number of pixels in binarization processing may be indicated as the number of levels of "gradation", and this indication is used in this description. That is, for example, binarization processing with a gradation of 256×256 is processing in which an image is equally divided in each of the vertical and horizontal directions into 256 pieces to define 256×256 sections and binarization is performed for each section (binarization processing A). The gradation number is set at an integer power of 2, and the greater the gradation number is, the higher the detection sensitivity for bright spots is.

According to a fourth aspect based on the fourth viewpoint, the present invention provides a glass plate including a main surface having a plurality of minute deformed portions, and the plurality of minute deformed portions are a plurality of recesses or a plurality of projections. Where an average value of lengths of two sides adjacent to each other of a minimum quadrilateral with four right angles surrounding each minute deformed portion as observed from a direction perpendicular to the main surface is defined as a dimension of the minute deformed portion, an average value of the dimensions of the plurality of minute deformed portions is 3.2 μm or greater.

Further, as observed from the direction, the plurality of minute deformed portions include: a first minute deformed portion corresponding to i) a minute deformed portion having a straight section contacting a receding portion of the quadrilateral, wherein the receding portion recedes from a part that is selected from sides of the quadrilateral and does not include a vertex of the quadrilateral, or ii) a minute deformed portion which is a polygon of which at least one internal angle is a reflex angle; and a second minute deformed portion having a shape different from the first minute deformed portion.

Advantageous Effects of Invention

According to the present invention, it is possible to provide a glass plate that is suitable for suppressing sparkle and is highly practical. The glass plate provided from the first aspect of the present invention is suitable for appropriately controlling gloss and haze over a wide range while suppressing sparkle.

The glass plate provided from the second aspect of the present invention is suitable for providing a favorable operation feeling to a user while suppressing sparkle.

The glass plate provided from the third aspect of the present invention has high reproducibility in mass production and is suitable for suppressing sparkle and also for reducing unevenness of reflected light occurring from the glass plate.

The glass plate provided from the fourth aspect of the present invention is suitable for suppressing sparkle and has a high degree of freedom in designing.

DESCRIPTION OF EMBODIMENTS

Hereinafter, embodiments of the present invention will be described, while the following description is not intended to limit the present invention to specific embodiments. In each embodiment, repetitive description is basically omitted. In each embodiment, description in another embodiment can be applied except for a case where apparently the description cannot be applied to the embodiment.

First Embodiment

First, an embodiment of a glass plate provided from the first aspect will be described. In this embodiment, the glass plate includes a main surface having a plurality of minute deformed portions. The plurality of minute deformed portions are a plurality of recesses or a plurality of projections. The plurality of minute deformed portions have an average dimension in a predetermined range, and satisfy a predetermined condition regarding dimension distribution. This condition is at least a condition a1 and/or a condition d1 described later.

Figure 1:
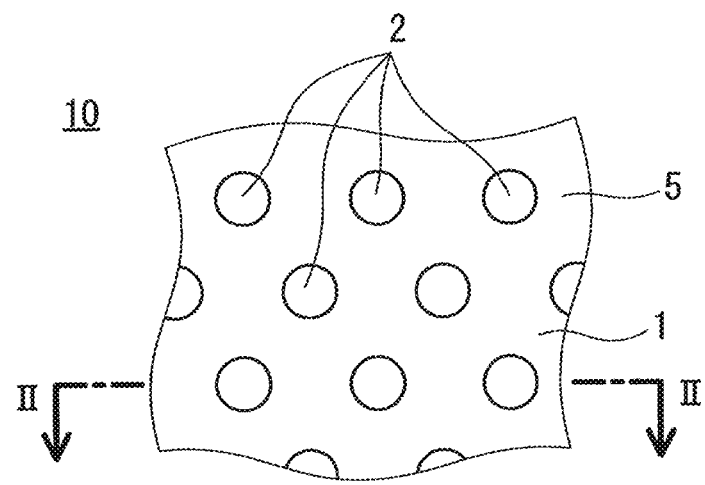
FIG. 1 is an enlarged plan view of a part of a main surface in an example of a glass plate of the present invention.
Figure 2A:
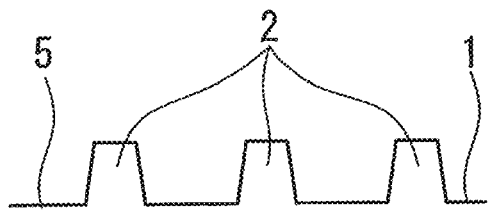
FIG. 2A is a sectional view of FIG. 1 in a case where minute deformed portions are projections.
Figure 2B:
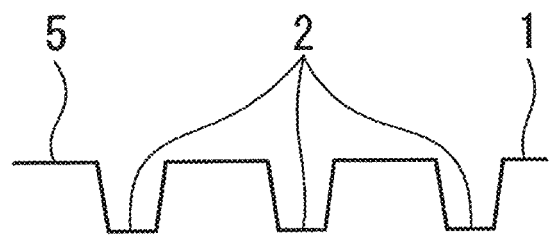
FIG. 2B is a sectional view of FIG. 1 in a case where minute deformed portions are recesses.

As shown in FIG. 1, a plurality of minute deformed portions 2 are formed on a main surface 1 of a glass plate 10. The minute deformed portion 2 is a minute region where the main surface 1 of the glass plate 10 is locally displaced in the thickness direction, which is also a direction perpendicular to the drawing plane of FIG. 1, of the glass plate. The minute deformed portion 2 may be either a projection or convex (FIG. 2A) or a recess or concave (FIG. 2B). The sectional shape of the projection or the recess shown in FIG. 2A or 2B is merely an example and is not limited thereto.

Figure 3:
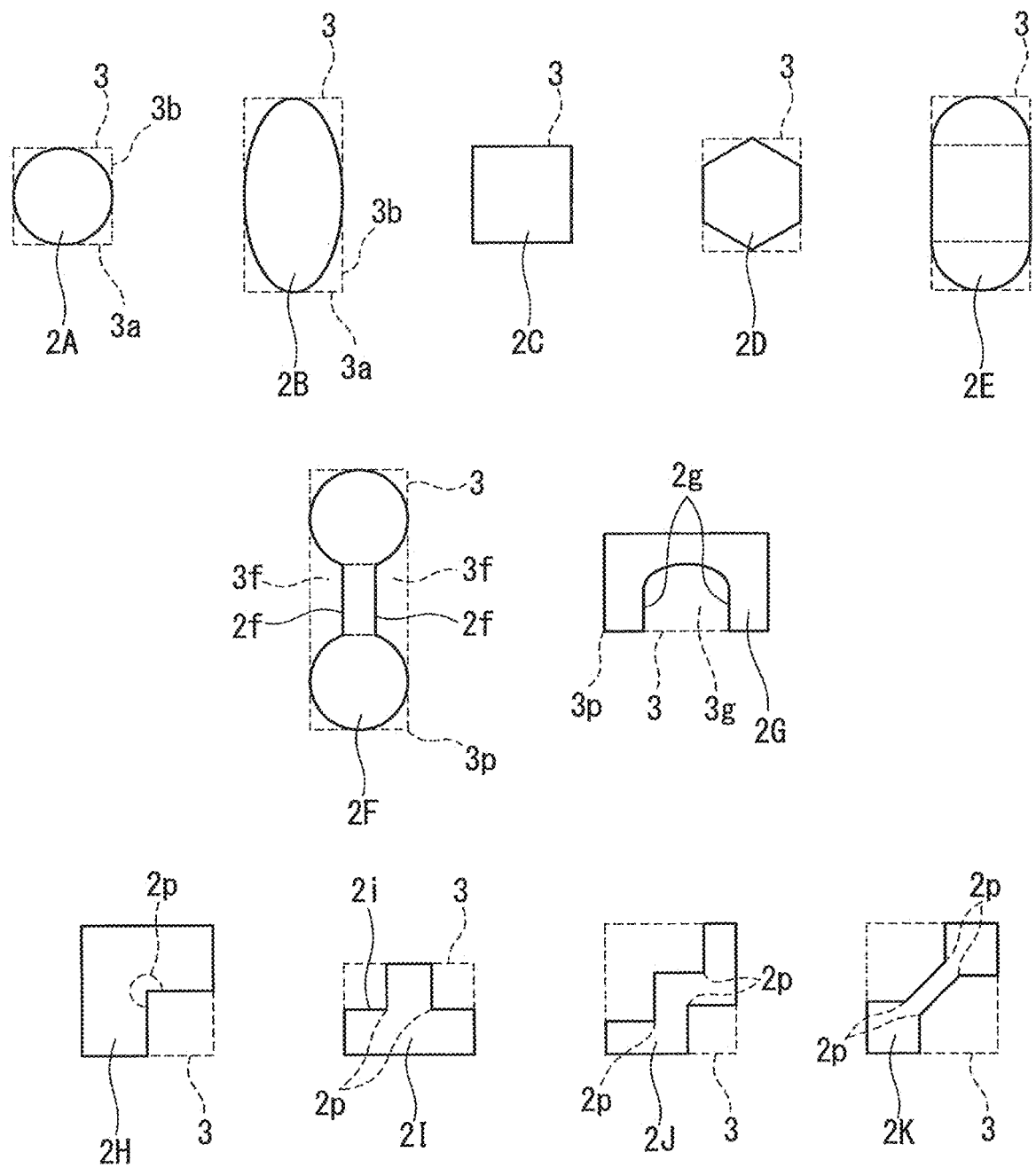
FIG. 3 is a plan view showing various shapes of the minute deformed portions.

The minute deformed portion 2 shown in FIG. 1 has a round shape as seen from the direction perpendicular to the main surface 1, but the shape of the minute deformed portion is not limited thereto. FIG. 3 shows minute deformed portions 2A to 2K having various shapes. Examples of the shape of the minute deformed portions are a circle 2A, an ellipse 2B, polygons 2C, 2D, and 2H to 2K, shapes 2E and 2F obtained by combining a plurality of the above shapes so as to contact each other or partially overlap each other, a shape 2G obtained by removing one or a plurality of parts from any of the above shapes, and a shape that can be approximated into any of the above shapes.

The shape of the minute deformed portion may be the polygon 2H to 2K of which at least one internal angle is a reflex angle, in other words, an angle greater than 180° and smaller than 360°. Examples of polygons having a reflex angle as an internal angle are an L shape 2H, a projecting shape 2I, a crank shape 2J, and an approximate dumbbell shape 2K. As seen from the direction perpendicular to the main surface 1, the minute deformed portion 2H has one reflex angle 2p as an internal angle thereof, and the minute deformed portions 2I to 2K each have two or more reflex angles 2p as internal angles thereof.

FIG. 3 also merely shows examples of the shapes of the minute deformed portions. To be exact, the shape of the minute deformed portion is defined using, as a reference, a boundary between the minute deformed portion 2 and a continuous portion 5 surrounding the minute deformed portion 2, that is, a bottom in the case of a projection, or an opening in the case of a recess. This reference is also applied to an area ratio and an average shortest distance described later.

Figure 4:
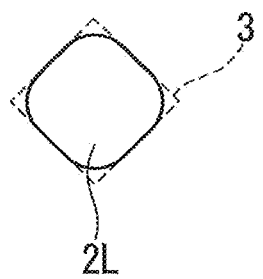
FIG. 4 is a plan view showing rounded corners of the minute deformed portion.

In the actual minute deformed portion, a corner thereof can have a slightly rounded shape. However, for describing the shapes in classified patterns, in this description, as long as a local deformed portion at the corner is within a range of 25% of segments forming the corner, the shape is described while neglecting the local deformed portion. For example, a minute deformed portion 2L shown in FIG. 4 is actually a square with rounded corners, but is treated as a square here.

The kinds of shapes of the minute deformed portions may be two or more kinds, three or more kinds, or further four or more kinds. Regarding the kinds of shapes, the number and the like thereof are defined with similar shapes regarded as identical. Presence of plural kinds of the minute deformed portions improves the degree of freedom in arrangement of the minute deformed portions on the main surface. In particular, in a case where the minute deformed portions of which the average dimension is in a predetermined range should be arranged such that an area ratio of the minute deformed portions with respect to the main surface is in a predetermined range and an average shortest distance between the minute deformed portions is ensured to be equal to or greater than a predetermined distance, using plural kinds of shapes of minute deformed portions improves the degree of freedom in designing of the arrangement thereof and makes it easy to achieve both conditions that are difficult to achieve at the same time. The same holds true for a case where the minute deformed portions should be arranged such that the periodicity thereof in a plane direction of the main surface is reduced within a predetermined range.

A shape A and a shape B of the minute deformed portions described below particularly greatly contribute to improvement of the degree of freedom in designing described above.

(Shape A) A minute deformed portion having a straight section contacting a receding region of the minimum quadrilateral with four right angles surrounding the minute deformed portion, wherein the receding portion recedes from a part that is selected from sides of the quadrilateral and does not include a vertex of the quadrilateral, in other words, a part of a side of the quadrilateral not including a vertex of the quadrilateral, to the inside of the quadrilateral, as seen from the direction perpendicular to the main surface (Shape B) A minute deformed portion having a polygonal shape of which at least one internal angle is a reflex angle, as seen from the direction perpendicular to the main surface The minute deformed portions 2F and 2G correspond to the shape A. These shapes have straight portions 2f, 2g contacting receding portions 3f, 3g each formed by receding a part of a side of the virtual minimum quadrilateral with four right angles 3. The part of the side of the quadrilateral 3 that recedes to form the receding portion 3f, 3g is set so as not to include a vertex 3p of the quadrilateral 3. The lengths of the straight portions 2f, 2g are not particularly limited, but may be, for example, 1 μm or greater, or further 1.5 μm or greater. A shape (see FIG. 5A) that is formed by circles partially overlapping each other, which can be accidentally formed even on a main surface of conventional antiglare glass, does not have a straight portion and thus does not correspond to the shape A. The minute deformed portions 2H to 2K correspond to the shape B. Formation of the shapes A and B has not been considered at all in conventional antiglare glass. However, these shapes are useful in a case of arranging the minute deformed portions so as not to be excessively close to each other on the main surface.

Preferably, the minute deformed portions include a first minute deformed portion having a shape corresponding to the shape A or the shape B, and a second minute deformed portion having a shape different from the first minute deformed portion. The second minute deformed portion may have a shape corresponding to the shape A or the shape B, or may have another shape. The first minute deformed portions may occupy, in terms of number, 10% or more, or further 20% or more, of all the minute deformed portions, or 90% or less, or further 80% or less, of all the minute deformed portions. The second minute deformed portions can also be disposed at any of the above ratios on the main surface.

The average shortest distance between the minute deformed portions is preferably 4.5 μm or greater, more preferably 7 μm or greater, and particularly preferably 15 μm or greater, or may be 305 μm or smaller, further 150 μm or smaller, particularly 80 μm or smaller, or in some cases, 50 μm or smaller. In this description, the average shortest distance between the minute deformed portions is determined by dividing, by the square root of the number of the minute deformed portions present in a region of a quadrilateral with four right angles on the main surface of the glass plate, a length of one side of a square having the same area as the quadrilateral with four right angles. Whether each minute deformed portion is present in the above region is determined on the basis of the position of the geometric center of the minute deformed portion. The above region is determined so as to include 30 or more, preferably 50 or more, and more preferably 80 to 100 minute deformed portions. Unless otherwise specified, a numerical value regarding the "dimension" of the minute deformed portion described below is also determined on the basis of the minute deformed portions in a certain region determined such that the above number of the minute deformed portions are present.

The "dimension" of the minute deformed portion is determined as follows. First, as observed from the direction perpendicular to the main surface 1, a quadrilateral with four right angles 3 that surrounds the minute deformed portion 2 and has the minimum area is virtually set. Next, the lengths of two adjacent sides 3a and 3b (see the minute deformed portions 2A and 2B in FIG. 3) of the virtual quadrilateral 3 are each measured. Finally, the average value of the lengths of the two sides 3a and 3b is calculated and used as the "dimension". The dimension of the minute deformed portion 2A which is a circle is the diameter of the circle.

It is desirable that the average value of the dimensions of a plurality of the minute deformed portions is adjusted to be in a range of 3.2 μm or greater, or in some cases, 4 μm or greater, further 5 μm or greater, particularly 5.5 μm or greater, especially 6 μm or greater, or in some cases, 7 μm or greater, or further 9 μm or greater. If the average value is smaller than the above range so that fine minute deformed portions are increased, scattering of transmitting light due to Mie scattering becomes remarkable. In order to more assuredly reduce scattering of transmitting light and achieve desirable haze, the minute deformed portions desirably satisfy a condition a1, more desirably satisfy a condition a2, even more desirably satisfy a condition a3, particularly desirably satisfy a condition a4, and especially desirably satisfy a condition a5 shown below.

(Condition a1) The ratio of minute deformed portions A1 having dimensions of 0.5 μm to 3.0 μm with respect to the plurality of minute deformed portions in terms of number is less than 5% and preferably less than 3%.

(Condition a2) The ratio of minute deformed portions A2 having dimensions of 0.5 μm to 3.6 μm with respect to the plurality of minute deformed portions in terms of number is less than 5% and preferably less than 3%.

(Condition a3) The ratio of minute deformed portions A3 having dimensions of 0.5 μm to 4.0 μm with respect to the plurality of minute deformed portions in terms of number is less than 5% and preferably less than 3%.

(Condition a4) The ratio of minute deformed portions A4 having dimensions of 0.5 μm to 5.3 μm with respect to the plurality of minute deformed portions in terms of number is less than 5% and preferably less than 3%.

(Condition a5) The ratio of minute deformed portions A5 having dimensions of 0.5 μm to 6.5 μm with respect to the plurality of minute deformed portions in terms of number is less than 5% and preferably less than 3%.

Figure 5A:
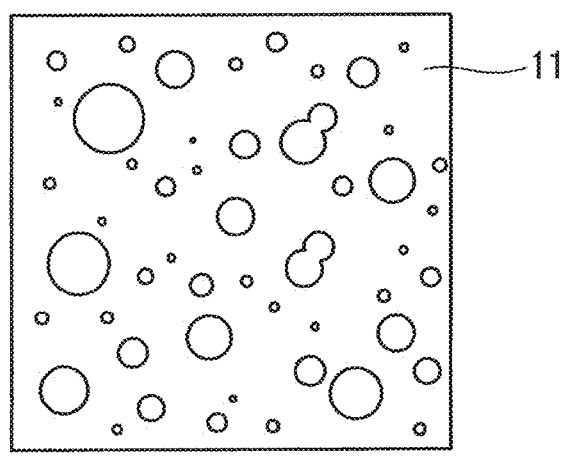
FIG. 5A is an enlarged plan view showing a part of a main surface in an example of a conventional glass plate.

In conventional antiglare glass, fine minute recesses/projections having dimensions of about 0.5 μm to 3.0 μm have not been paid attention to. If sandblasting/etching or etching with a condition of developing surface recesses/projections is applied over the entire main surface of the glass plate, a considerable number of minute recesses/projections that are fine to the above extent are generated, so that Mie scattering of light in a visible region is likely to be remarkable. FIG. 5A shows a typical example of a main surface of conventional antiglare glass. The distribution of the radiuses of recesses that are minute deformed portions present on a main surface 11 is extremely wide. Some of the recesses are connected and integrated with adjacent recesses, and this also makes the distribution of the radiuses of the recesses even wider.

Figure 5B:
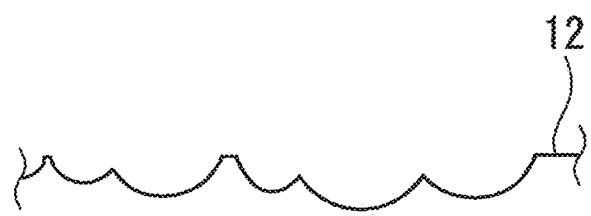
FIG. 5B is an enlarged sectional view showing a part of a main surface in another example of a conventional glass plate.
Figure 6:
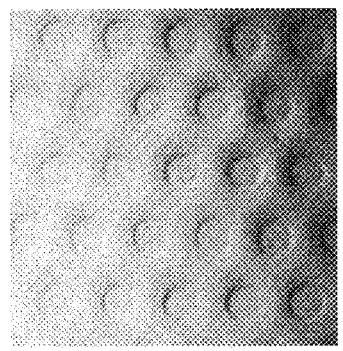
FIG. 6 shows an image obtained by observing a 50 μm square (region of 50 μm×50 μm) on a main surface of a glass plate in Example 1 by a scanning electron microscope (SEM).
Figure 7:
FIG. 7 shows an image obtained by observing a 50 μm square on a main surface of a glass plate in Example 2 by the SEM.
Figure 8:
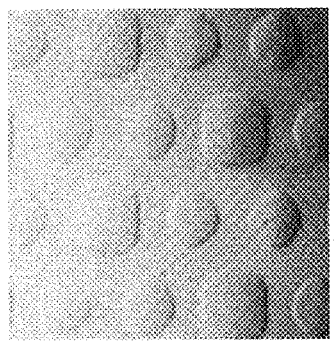
FIG. 8 shows an image obtained by observing a 50 μm square on a main surface of a glass plate in Example 3 by the SEM.
Figure 9:
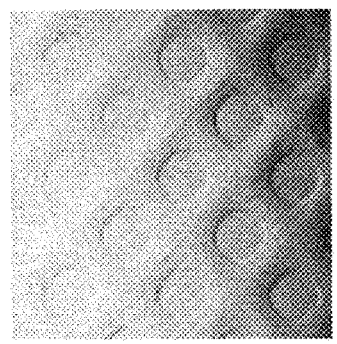
FIG. 9 shows an image obtained by observing a 50 μm square on a main surface of a glass plate in Example 4 by the SEM.
Figure 10:
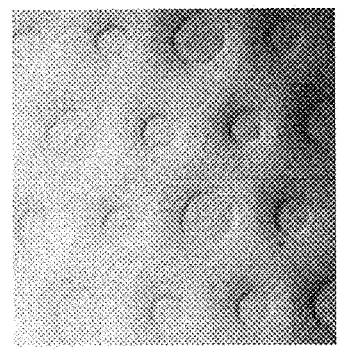
FIG. 10 shows an image obtained by observing a 50 μm square on a main surface of a glass plate in Example 5 by the SEM.
Figure 11:
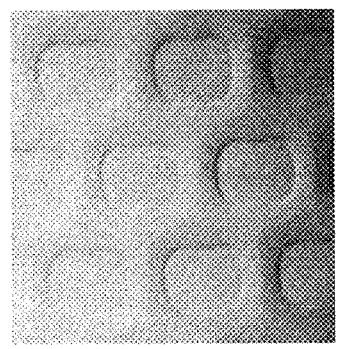
FIG. 11 shows an image obtained by observing a 50 μm square on a main surface of a glass plate in Example 6 by the SEM.
Figure 12:
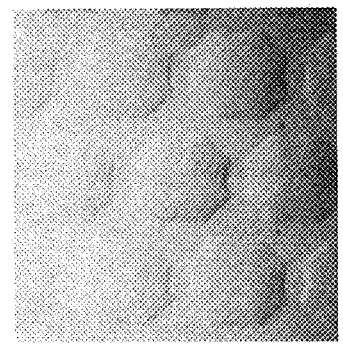
FIG. 12 shows an image obtained by observing a 50 μm square on a main surface of a glass plate in Example 7 by the SEM.
Figure 13:
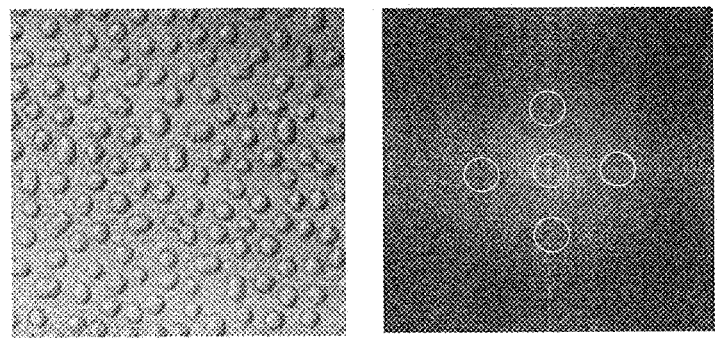
FIG. 13 shows an image obtained by observing a 200 μm square on a main surface of a glass plate in Example 8 by the SEM, and a 2-dimensional Fourier transform image (FT image) obtained from that image.
Figure 14:
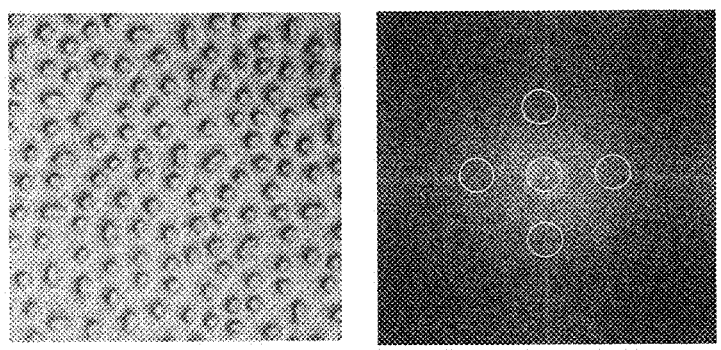
FIG. 14 shows an image obtained by observing a 200 μm square on a main surface of a glass plate in Example 9 by the SEM, and an FT image obtained from that image.
Figure 15:
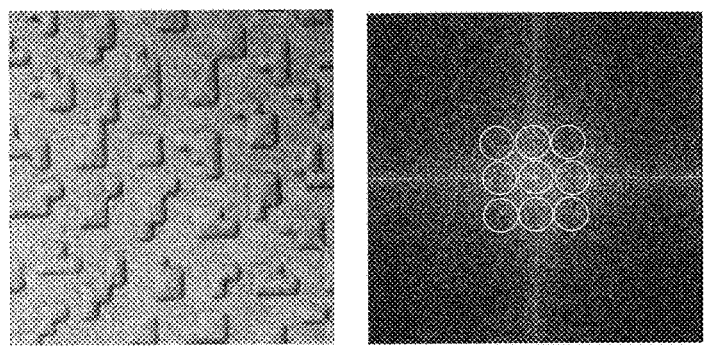
FIG. 15 shows an image obtained by observing a 200 μm square on a main surface of a glass plate in Example 10 by the SEM, and an FT image obtained from that image.
Figure 16:
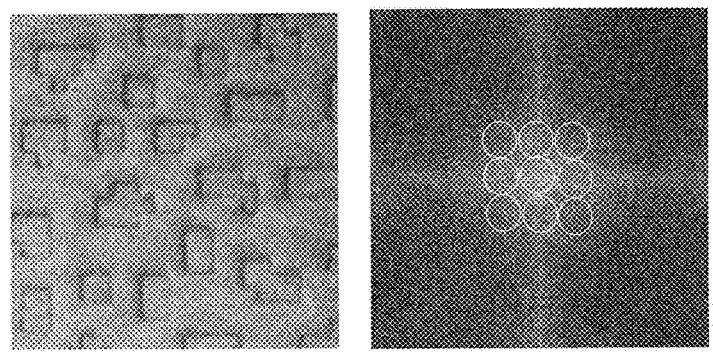
FIG. 16 shows an image obtained by observing a 200 μm square on a main surface of a glass plate in Example 11 by the SEM, and an FT image obtained from that image.
Figure 17:
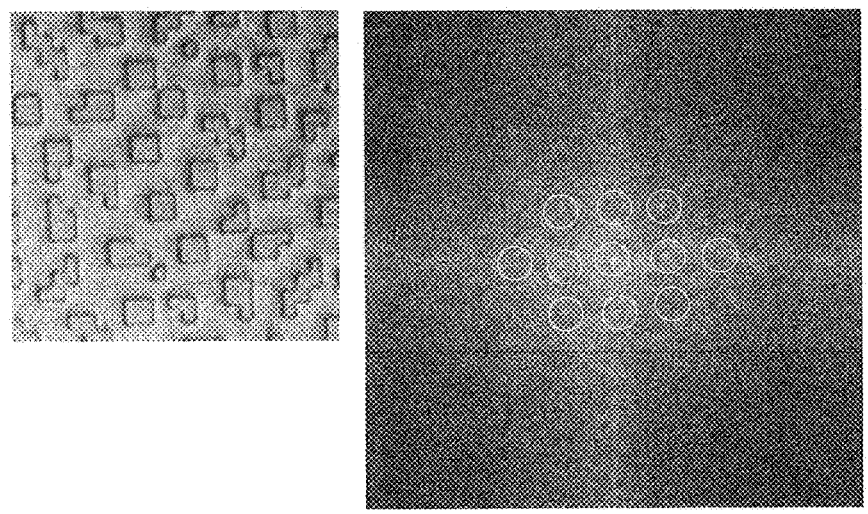
FIG. 17 shows an image obtained by observing a 200 μm square on a main surface of a glass plate in Example 12 by the SEM, and an FT image obtained from that image.
Figure 18:
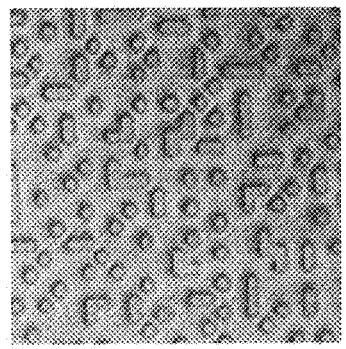
FIG. 18 shows an image obtained by observing a 200 μm square on a main surface of a glass plate in Example 13 by the SEM, and an FT image obtained from that image.
Figure 18:
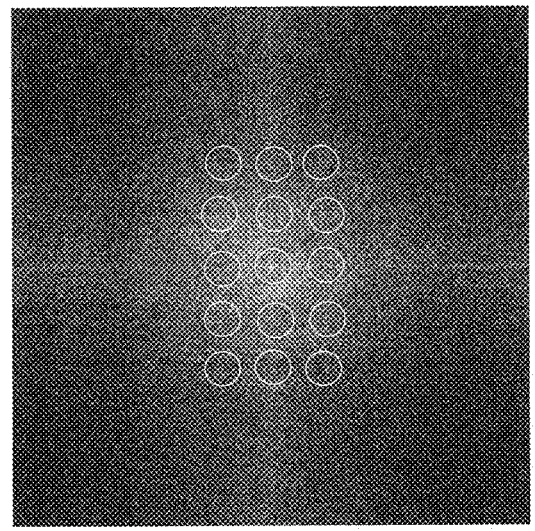
Figure 19:
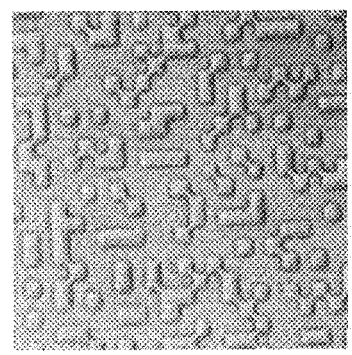
FIG. 19 shows an image obtained by observing a 200 μm square on a main surface of a glass plate in Example 14 by the SEM, and an FT image obtained from that image.
Figure 19:
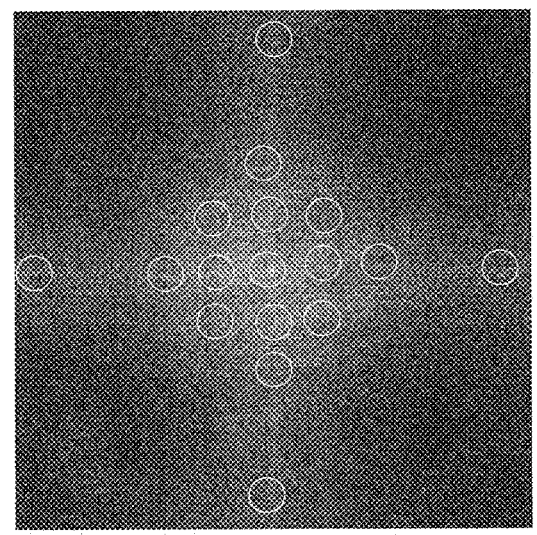
Figure 20:
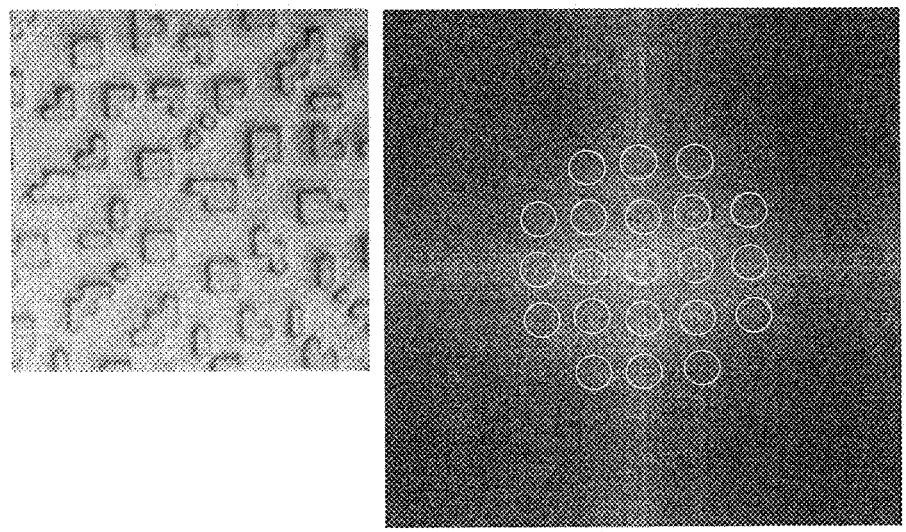
FIG. 20 shows an image obtained by observing a 200 μm square on a main surface of a glass plate in Example 15 by the SEM, and an FT image obtained from that image.
Figure 21:
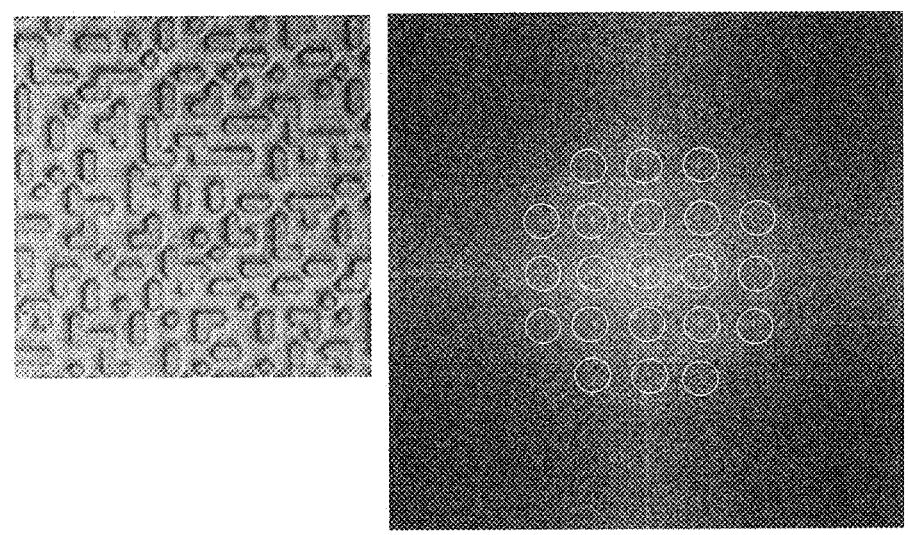
FIG. 21 shows an image obtained by observing a 200 μm square on a main surface of a glass plate in Example 16 by the SEM, and an FT image obtained from that image.
Figure 22:
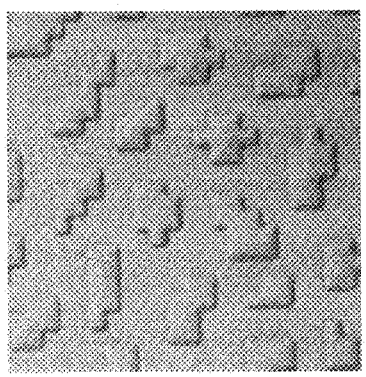
FIG. 22 shows an image obtained by observing a 200 μm square on a main surface of a glass plate in Example 17 by the SEM, and an FT image obtained from that image.
Figure 22:
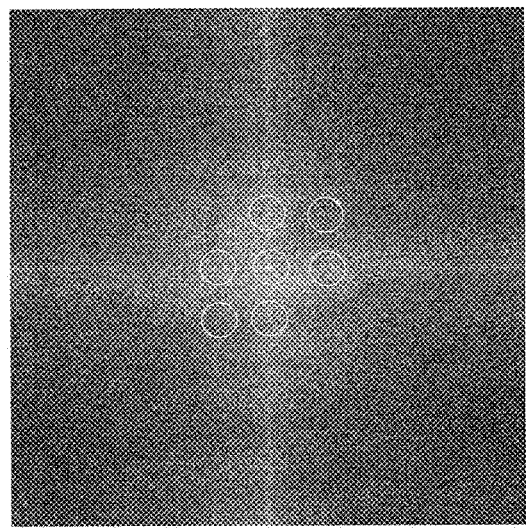

FIG. 5B shows a cross-section in a state in which receding of the main surface is further progressed through etching or the like from the state shown in FIG. 5A. In this state, the radiuses of the recesses are enlarged, and thus continuous flat portions are decreased on a main surface 12. Also in the state shown in FIG. 5B, there are fine recesses remaining and the distribution of the radiuses of the recesses is still wide.

The upper limit of the average value of the dimensions of the minute deformed portions may be determined as appropriate in accordance with the pixel density of an image display device used in combination with the glass plate, more specifically, the subpixel size of the image display device. Specifically, the upper limit of the average value of the dimensions of the minute deformed portions is preferably equal to or smaller than about half a short side of the subpixel size. The upper limit of the average value of the dimensions of the minute deformed portions may be set to (d/1.9) μm and preferably (d/2) μm. Here, a subpixel size d is a short side of the subpixel.

In an image display device having a pixel density of 125 ppi, d is generally about 67.5 μm, and therefore, the upper limit of the average value of the dimensions of the minute deformed portions 2 is 35.5 μm and preferably 33.8 μm. The above upper limit for an image display device having a pixel density of 264 ppi is 16.9 μm and preferably 16.0 μm. The above upper limit for an image display device having a pixel density of 326 ppi is 13.6 μm and preferably 13.0 μm.

The pixel density of an image display device that requires a glass plate having an antiglare function is approximately 125 ppi or greater, and therefore the upper limit of the average value of the dimensions of the minute deformed portions is set to 35.5 μm or smaller, and as necessary, may be set in a range smaller than 35.5 μm. Specifically, where a short side of the subpixel size of an image display device used in combination is d μm, the average value of the dimensions of the minute deformed portions may be set to 35.5 μm or smaller and (d/1.9) μm or smaller.

For the above reason, the average value of the dimensions of the minute deformed portions is generally set to 3.2 μm to 35.5 μm. However, if there is a possibility of being applied also to a high-definition image display device, the upper limit of the average value of the dimensions of the minute deformed portions may be set to, for example, 16.9 μm or smaller, or further 13.6 μm or smaller, or if necessary, may be set to 12 μm or smaller, or particularly smaller than 10 μm.

As described with reference to FIG. 5A and FIG. 5B, the distribution of the radiuses of the recesses in the conventional antiglare glass is extremely wide. Therefore, if the average value of the dimensions of the recesses that are minute deformed portions is adjusted in the above-described range, the ratio of fine minute deformed portions having dimensions of about 0.5 μm to 3.0 μm increases. On the other hand, if etching is progressed in order to decrease the ratio of the fine minute deformed portions, the minute deformed portions become extremely large, so that it becomes inappropriate to suppress sparkle.

Depending on the shapes of the minute deformed portions, even if the dimension thereof is slightly greater than a calculated value based on d, this might not become a cause of sparkle. However, in order to more assuredly suppress sparkle, it is desirable that the minute deformed portions satisfy a condition b and/or a condition c shown below.

(Condition b) The ratio of minute deformed portions B having dimensions greater than 35.5 μm with respect to the plurality of minute deformed portions in terms of number is less than 15% and preferably less than 10%.

(Condition c) Where a short side of the subpixel size of an image display device used in combination is d μm, the ratio of minute deformed portions C having dimensions greater than (d/1.9) μm with respect to the plurality of minute deformed portions in terms of number is smaller than 15% and preferably smaller than 10%.

Preferably, the dimensions of the minute deformed portions have small variations and are uniformed. The coefficient of variation of dimensions measured for 50 and preferably 80 to 100 minute deformed portions randomly selected is, for example, 40% or less, 35% or less, 30% or less, 25% or less, 23% or less, or further 22% or less, and is preferably 21% or less and more preferably 18% or less, or in some cases, 15% or less, 13% or less, 10% or less, further 5% or less, or particularly 3% or less. Conventionally, the coefficient of variation of dimensions of minute deformed portions has not been paid attention to. By paying attention to the coefficient of variation, the following desired condition d1 can be derived. As is well known, the coefficient of variation can be calculated by dividing a standard deviation by an average value.
(Condition d1)

The coefficient of variation of the dimensions of the plurality of minute deformed portions is 40% or less, or further any one of the above-described values or smaller.

The dimensions of the minute deformed portions may have variations to such an extent that the above coefficient of variation is 3 to 40%, further 3 to 23%, particularly 5 to 22%, or in some cases, 5 to 21%. The variations to such an extent can contribute to reduction of reflection unevenness. In a case of placing importance on reduction of reflection unevenness, the coefficient of variation may be more than 23%. For example, a glass plate in which the coefficient of variation of the dimensions of the minute deformed portions is in a range of 3 to 40% and the average value of the dimensions is 13.6 μm or smaller, or particularly 9 μm or greater and 13.6 μm or smaller, is suitable for suppressing sparkle and suppressing reflection unevenness, when combined with an image display device having a pixel density of 326 ppi. In this case, the coefficient of variation is preferably 12.3% or more, and particularly preferably 12.5% or more, and is, for example, 12.3 to 35%. In addition, in this case, if the number of bright spots on a 2-dimensional Fourier transform image of the processed image having been subjected to the binarization processing A described above is 15 or smaller, it becomes possible to further suppress reflection unevenness.

In a case of intentionally forming plural kinds of minute deformed portions such that the plural kinds of minute deformed portions clearly differ in dimension from each other and are discriminable from each other by the dimensions, variations in the dimensions of the minute deformed portions may be considered for each kind. A case where it can be said that "clearly differ in dimension" is a case where, for example, the minute deformed portions on the main surface of the glass plate include minute deformed portions α in which the average value of the dimensions is μα and the minimum value of the dimensions is minα, and minute deformed portions β in which the average value of the dimensions is μβ and the maximum value of the dimensions is maxβ, and a relationship of μα>μβ and minα−maxβ>1 μm is satisfied. The latter expression may be minα−maxβ>2 μm, or further, minα−maxβ>3 μm. A case where it can be said that "discriminable" is a case where another kind of minute deformed portions having dimensions between minα and maxβ are not substantially present. A case where minute deformed portions having specific dimensions "not substantially present" refers to a case where the ratio of such minute deformed portions, e.g., the ratio of minute deformed portions having dimensions between minα and maxβ, with respect to all minute deformed portions in terms of number, is less than 3%, particularly less than 1%, or especially less than 0.5%. In this example, the minute deformed portions may further include minute deformed portions γ that clearly differ in dimension from the minute deformed portions α, β and are discriminable therefrom. In a case of including plural kinds of minute deformed portions that have dimensions clearly different from each other and are discriminable by the dimensions, it is desirable to satisfy the following condition d2, together with the condition d1 or instead of the condition d1.
(Condition d2)

In a case of including plural kinds of minute deformed portions such that the plural kinds of minute deformed portions clearly differ in dimension from each other and are discriminable from each other, the coefficient of variation calculated for the dimensions of each kind of minute deformed portions (α, β, γ, . . . ) is 23% or less, 22% or less, 21% or less, 15% or less, 10% or less, or further 7% or less, and preferably 5% or less. Each kind of minute deformed portions (α, β, γ, . . . ) is set so as to occupy, in terms of number, 15% or more, 20% or more, or further 30% or more of all minute deformed portions.

Preferably, the glass plate satisfies the condition d1 and/or the condition d2. Preferably, the glass plate satisfying the condition d2 satisfies the condition a1 as a premise thereof.

The plurality of minute deformed portions 2 may be projections or recesses. However, the plurality of minute deformed portions 2 are preferably projections, for the following reason. Firstly, in a case of a glass plate used as a touch panel, projections can provide a surface having a smaller resistance to a finger than that of recesses. Therefore, projections are more advantageous in a case of placing importance on a user's operation feeling. Secondly, in a process of causing the glass surface to recede by etching or the like, the dimensions of recesses might be enlarged from a desired design value as time elapses, whereas, in a case of projections, enlargement of the dimensions thereof from a design value, i.e., enlargement of the dimensions due to so-called over-etching can be easily prevented. Therefore, for more assuredly preventing sparkle, projections are more advantageous. As described later, it is preferable that recesses or projections are each surrounded by a substantially flat continuous portion.

However, in a case of placing importance on efficiency of etching work, in other words, reduction of the amount of glass to be etched, recesses are more advantageous.

The depths or the heights of the minute deformed portions 2 are not particularly limited, but are, for example, 0.1 μm or greater, preferably 0.2 μm or greater, and more preferably 0.3 μm or greater, and for example, 1 μm or smaller, preferably 0.8 μm or smaller, and more preferably 0.7 μm or smaller.

Returning to FIG. 1, the continuous portion 5 surrounding each minute deformed portion 2 on the main surface 1 will be described. The continuous portion 5 extends between and around the minute deformed portions 2 without being separated by the minute deformed portions 2. In other words, on the main surface 1, the minute deformed portions 2 form island-shaped regions surrounded by the continuous portion 5. Preferably, the continuous portion 5 is a substantially flat region. In this description, the "substantially flat" region is a region in which the surface roughness calculated by a calculation formula for the arithmetic mean roughness Ra on the basis of a surface roughness curve in the region is 0.07 μm or smaller, preferably 0.05 μm or smaller, more preferably 0.02 μm or smaller, and particularly preferably 0.01 μm or smaller. Whether the region corresponds to a substantially flat region can be evaluated through cross-section SEM observation, for example. As is obvious from FIG. 5B, a substantially flat region is not present on the surface of the glass plate on which recesses/projections have been developed by the conventional etching. In the conventional etching, for developing recesses/projections on the surface, etching is progressed after fine recesses are generated by sandblasting in advance or while precipitates are locally generated. With such a method, in practice, it is impossible to control the positions of start points of minute deformed portions and distribution of the dimensions thereof, and therefore, at a stage when recesses/projections have been developed, a flat region is lost on the main surface (FIG. 5B).

The substantially flat region may occupy 40% or more, 50% or more, or further 60% or more of the main surface of the glass plate. This region may occupy the remaining part other than the area occupied by the minute deformed portions.

In FIG. 1, the minute deformed portions 2 having the same shape are regularly arranged on the main surface 1. This designing is basically preferable for stabilizing the property of mass-produced products. In designing in which minute deformed portions having uneven sizes are irregularly arranged, some minute deformed portions are connected and integrated with each other during work such as etching, so that excessively large minute deformed portions are likely to be formed (see FIG. 5A). In addition, for a glass plate having a particularly large area, it is not easy to sufficiently suppress local difference in property. The above regular arrangement eliminates such disadvantages.

However, unnatural rainbow-like unevenness of reflection light might be observed from a main surface on which minute deformed portions are arranged with high regularity. Although this unevenness is not as conspicuous as sparkle, it is desirable to suppress this unevenness.

The unevenness of reflection light can be suppressed by reducing regularity of arrangement of the minute deformed portions. Specifically, it is preferable to reduce the periodicity of arrangement of the minute deformed portions in a plane direction of the main surface to such an extent that 2 to 30, further 3 to 30, preferably 5 to 25, more preferably 9 to 18, particularly preferably 13 to 17, and as another more preferable example, 5 to 15 bright spots are observed on a 2-dimensional Fourier transform image of the processed image having been subjected to the binarization processing A described above for discriminating the minute deformed portions from the surrounding region in a 200 μm square region on the main surface and/or in a region on the main surface where there are 80 to 150 minute deformed portions having dimensions of 0.5 μm or greater, in a case of observing from the direction perpendicular to the main surface. In a conventional glass plate having an antiglare function, there is no periodicity in arrangement of minute deformed portions at all, or if any, the degree of periodicity is very low. Therefore, only one bright spot is observed on the above 2-dimensional Fourier transform image. On the other hand, in the arrangement having high periodicity to the extent shown in FIG. 1, a large number of bright spots that are approximately several hundred or more bright spots are generated on the above 2-dimensional Fourier transform image.

The "region on the main surface where there are 80 to 150 minute deformed portions having dimensions of 0.5 μm or greater" may be set as a four right angles quadrilateral region on the main surface. In this case, the number of minute deformed portions is counted including a minute deformed portion of which a part is present in the four right angles quadrilateral region.

When regularity of arrangement of minute deformed portions is reduced, the number of bright spots described above may differ among manufacturing lots, or locally. It is considered that this is because a manufacturing condition such as an etching condition slightly varies inevitably so that the positions and/or the sizes of the minute deformed portions are influenced. According to studies by the present inventors, such instability of the number of bright spots becomes remarkable when the average number of bright spots obtained in the manufacturing condition becomes about 15 or less, and by the influence thereof, there is a case where a glass plate in which the number of bright spots is decreased to one is obtained. It has been confirmed that, also from such a glass plate, desired property is obtained to such an extent that is not substantially different from a glass plate in which the number of bright spots is two or more. It is considered that this is because there is regularity to such an extent that the regularity cannot be confirmed through the binarization processing A. In actuality, if image binarization processing is performed by applying a gradation higher than 256×256, e.g., a gradation of 8192×8192 for a glass plate of a manufacturing lot in which the number of bright spots is decreased to one, two or more bright spots described above are observed. This is because the number of bright spots increases as the gradation becomes higher. In addition, it is possible to obtain desired property also from a glass plate designed with further reduced regularity of arrangement. However, depending on the degree of the reduction, there is a case where two or more bright spots cannot be measured and thus presence of regularity cannot be confirmed, unless binarization is performed with a high gradation of about several ten thousand as in the binarization processing B. Considering the above, the minute deformed portions may be designed so that the number of bright spots by the binarization processing A becomes one, under the premise that two or more bright spots can be confirmed by a gradation of 8192×8192 in a simple way or the binarization processing B (65536×65536) in a strict way. On the other hand, even if the conventional glass plates disclosed in Patent Literature 1 to 3 are measured by applying a high gradation of about several thousand or further the binarization processing B, the number of obtained bright spots is one.

The area ratio of the minute deformed portions, more specifically, the ratio of the total area of the minute deformed portions with respect to the area of the main surface as seen from the direction perpendicular to the main surface, is not particularly limited, but is, for example, 1.5 to 60%, further 1.5 to 50%, or particularly 1.5 to 40%. The area ratio of the minute deformed portions is preferably 2% or more, more preferably 5% or more, or in some cases, 8% or more, and is preferably 45% or less, more preferably 40% or less, particularly preferably 30% or less, or in some cases, 25% or less, further 23% or less, or particularly 20% or less.

The glass plate having the minute deformed portions described above is suitable for adjusting both of gloss and haze in a desirable range while suppressing sparkle. Specifically, where gloss is denoted by X (%) and haze is denoted by Y (%), it is possible to satisfy a relationship of Expression (I). It is possible to provide a glass plate that satisfies Expression (I) even if the minute deformed portions are controlled to be fine to such an extent that can prevent sparkle even when the glass plate is used in combination with an image display device of 326 ppi, specifically, even if, for example, the average dimension of the minute deformed portions is set to 3.2 μm to 13.6 μm.

$$Y \leq -\tfrac{1}{6}X + 20 \qquad \text{(I)}$$

Through studies by the present inventors, it has become apparent that, if haze is sufficiently suppressed, practicality of the glass plate can be ensured even when gloss is high to a certain extent. The glass plate having the minute deformed portions described above is also suitable for adjusting haze and gloss in such a range, and specifically, can satisfy a relationship of Expression (II).

$$Y \leq -\tfrac{1}{40}X + 8 \qquad \text{(II)}$$

In the glass plate that satisfies Expression (II), the value of Y may be 6 or smaller, or further 5 or smaller. The values of X and Y may be respectively limited within ranges of $100 \leq X \leq 160$ and $0 \leq Y \leq 6$ or further $100 \leq X \leq 150$ and $0 \leq Y \leq 5$. Expression (II) may be $Y \leq -\frac{1}{40}X + 7.5$.

The glass plate having the minute deformed portions, provided by the present invention, can satisfy at least one of the relationships of Expressions (I) and (II).

Glass plates presented as Comparative Examples in Patent Literature 1 to 3 include glass plates that are low in haze and gloss to such an extent that satisfies Expression (I) and/or Expression (II) (Comparative Examples 1 to 5 in Patent Literature 2 and Experimental Example 8 in Patent Literature 3). However, conventionally, the glass plates that are low in haze and gloss to this extent cannot suppress sparkle, as described in Patent Literature 1 to 3. This is because the minute deformed portions are extremely great overall. With such a glass plate, it is difficult to satisfy the condition b, and also, it is difficult to satisfy the condition d1 because variations in the dimensions are great. On the other hand, if the dimensions of the minute deformed portions in the entirety are controlled so that sparkle is suppressed (Examples in Patent Literature 1 to 3), the ratio of fine minute deformed portions increases and thus the condition a1 is no longer satisfied, so that, in particular, it becomes difficult to suppress haze. With the conventional etching methods disclosed in Patent Literature 1 to 3, it is difficult to uniform the dimensions of the minute deformed portions to such an extent that satisfies the condition d1. Therefore, Examples in Patent Literature 1 to 3 do not satisfy the relationships of Expressions (I) and (II).

In contrast to such a conventional technology level, according to the present embodiment, it is possible to provide a glass plate that satisfies Expression (I) and/or Expression (II) even if, for example, the average value of the dimensions of the minute deformed portions is limited to be equal to or greater than a value calculated from a pixel density of 326 ppi so as to suppress sparkle, specifically, limited to 13.6 μm or smaller, further 12 μm or smaller, or in some cases, smaller than 10 μm. In other words, the present invention can provide the following glass plate from the above-described aspects.

A glass plate including a main surface having a plurality of minute deformed portions, wherein
  the plurality of minute deformed portions are a plurality of recesses or a plurality of projections,
  where an average value of two sides adjacent to each other of a minimum quadrilateral with four right angles surrounding each minute deformed portion as observed from a direction perpendicular to the main surface is defined as a dimension of the minute deformed portion, an average value of the dimensions of the plurality of minute deformed portions is 3.2 μm to 13.6 μm, and
  where gloss is denoted by X (%) and haze is denoted by Y (%), at least one of Expression (I) and Expression (II) is satisfied.

Further, the above glass plate may satisfy the condition b and/or the condition c, may satisfy the condition d1 and/or the condition d2, and may be provided with other features described in the first embodiment. In this description, gloss is measured in accordance with "Method 3 (60-degree specular gloss)" of "Specular glossiness-Methods of measurement" in Japanese Industrial Standards (JIS) Z8741-1997, and haze is measured in accordance with JIS K7136: 2000.

Second Embodiment

Next, an embodiment of a glass plate provided from the above second aspect will be described. In this embodiment, the glass plate includes a main surface having a plurality of minute deformed portions. The plurality of minute deformed portions are a plurality of projections. Preferably, the plurality of minute deformed portions are each surrounded by a substantially flat continuous portion. The plurality of minute deformed portions have an average dimension in a predetermined range.

Also in the present embodiment, the average dimension of the minute deformed portions is set in a range of 3.2 μm to 35.5 μm. Preferable ranges and conditions for the shapes, the dimensions, the mutual distance, and the area ratio of the minute deformed portions are as described in the first embodiment. Also in the present embodiment, it is preferable to reduce the periodicity of arrangement of the minute deformed portions to such an extent that bright spots whose number is described in the first embodiment are observed on the above-described 2-dimensional Fourier transform image. Also in the present embodiment, it is possible to provide a glass plate that satisfies Expression (I) and/or Expression (II), and also the glass plate can be provided with other features described in the first embodiment.

However, in the present embodiment, the minute deformed portions formed on the main surface are projections. A preferable range of the heights of the projections is as described in the first embodiment. Since the minute deformed portions are projections, it is possible to provide a more favorable operation feeling to a user who uses the glass plate as a touch panel. The difference in the operation feeling from the glass plate in which the minute deformed portions are recesses becomes remarkable in an environment having a low relative humidity. In addition, in manufacturing of the minute deformed portions, projections allow the dimensions thereof to be easily controlled to a predetermined limit or lower, and therefore, with the projections, sparkle can be more assuredly prevented. Further, in a case where the continuous portion surrounding the projections is substantially flat, the main surface of the glass plate of the present embodiment makes it relatively easy to remove dust adhering from the atmosphere or sebum transferred from a finger of a user.

Third Embodiment

Further, an embodiment of a glass plate provided from the above third aspect will be described. In this embodiment, the glass plate includes a main surface having a plurality of minute deformed portions. The plurality of minute deformed portions are a plurality of recesses or a plurality of projections. The plurality of minute deformed portions have an average dimension in a predetermined range. A predetermined 2-dimensional Fourier transform image obtained from the main surface has bright spots whose number is in a predetermined range. The number in the predetermined range can be determined on the basis of a case where binarization processing is performed with a gradation of 256×256 (binarization processing A) and as necessary, further with a gradation of 65536×65536 (binarization processing B).

Also in the present embodiment, the average dimension of the minute deformed portions is set in a range of 3.2 μm to 35.5 μm. Preferable ranges and conditions for the shapes, the dimensions, the mutual distance, and the area ratio of the minute deformed portions are as described in the first embodiment. Also in the present embodiment, the minute deformed portions are preferably projections, and preferable heights thereof are as described in the first embodiment.

Also in the present embodiment, it is possible to provide a glass plate that satisfies Expression (I) and/or Expression (II).

However, in the present embodiment, arrangement of the minute deformed portions is not the arrangement having high periodicity as shown in FIG. 1, but has periodicity to such an extent that 3 to 30, preferably 5 to 25, more preferably 9 to 18, particularly preferably 13 to 17, and as another preferable example, 5 to 15 bright spots are observed on a 2-dimensional Fourier transform image based on the binarization processing A. The periodicity reduced to the above extent is suitable for both ensuring reproducibility in mass production and reducing unevenness of reflected light occurring from the glass plate at the same time. As described above, if the periodicity is reduced, the number of bright spots might be reduced to only one, depending on the manufacturing lot. However, also in this case, when binarization processing with a gradation higher than 256×256, e.g., with a gradation of about several thousand, or further the binarization processing B with a gradation of 65536× 65536 is performed, two or more bright spots are observed, and thus periodicity can be confirmed though the extent thereof is low.

As described above, a 2-dimensional Fourier transform image can be obtained from a processed image having been subjected to binarization processing for discriminating the minute deformed portions from the surrounding region in a 200 μm square region on the main surface of the glass plate or in a region on the main surface where there are 80 to 150 minute deformed portions having dimensions of 0.5 μm or greater, as observed from the direction perpendicular to the main surface. Setting of a region with one side being 200 μm can be simply performed. On the other hand, setting of a region based on the number is more suitable for correctly evaluating the periodicity of minute deformed portions on a main surface in which the distribution density of the minute deformed portions is small.

In the present embodiment, the glass plate may be provided with a condition that the coefficient of variation of the dimensions of the minute deformed portions is 3 to 40% or further 3 to 23%, instead of the condition that the 2-dimensional Fourier transform image has a predetermined number of bright spots. A preferable range of the coefficient of variation in this case is 5 to 22%, further 8 to 21%, or particularly 12.5 to 21%.

In the present embodiment, the glass plate may be provided with a condition that the coefficient of variation of the dimensions of the minute deformed portions is 3% or more, and the condition a1, i.e., a condition that the ratio of fine minute deformed portions is small, instead of the condition that the 2-dimensional Fourier transform image has a predetermined number of bright spots. A preferable range of the coefficient of variation in this case is 5% or more, further 8% or more, or particularly 12.5% or more.

Fourth Embodiment

Subsequently, an embodiment of a glass plate provided from the above fourth aspect will be described. In this embodiment, the glass plate includes a main surface having a plurality of minute deformed portions. The plurality of minute deformed portions are a plurality of recesses or a plurality of projections. The plurality of minute deformed portions have an average dimension in a predetermined range. The plurality of minute deformed portions include a first minute deformed portion having a predetermined shape and a second minute deformed portion having a shape different from the first minute deformed portion.

In the present embodiment, the average dimension of the minute deformed portions is set to 3.2 μm or greater, e.g., 3.2 μm to 50 μm and preferably 3.2 μm to 35.5 μm. The first minute deformed portion has a large apparent dimension but is less likely to cause sparkle. Preferable ranges and conditions for the shapes, the dimensions, the mutual distance, and the area ratio of the minute deformed portions are as described in the first embodiment. Also in the present embodiment, the minute deformed portions are preferably projections, and preferable heights thereof are as described in the first embodiment. Also in the present embodiment, it is preferable to reduce the periodicity of arrangement of the minute deformed portions to such an extent that bright spots whose number is described in the first embodiment are observed on the above-described 2-dimensional Fourier transform image. Also in the present embodiment, it is possible to provide a glass plate that satisfies Expression (I) and/or Expression (II).

However, in the present embodiment, the minute deformed portions include the first minute deformed portion corresponding to the shape A or the shape B described above, and the second minute deformed portion having a shape different from the shape of the first minute deformed portion. The second minute deformed portion may, or may not, correspond to the shape A or the shape B. Preferable presence ratios of the first minute deformed portions and the second minute deformed portions are as described in the first embodiment. Formation of the first minute deformed portion has not been intended conventionally, but as is obvious from the characteristic shape thereof, combining the first minute deformed portion with the second minute deformed portion improves the degree of freedom in designing of arrangement of the minute deformed portions on the main surface. The characteristic shapes of the minute deformed portions facilitate adjustment of the area ratio and/or regularity of the minute deformed portions.

[Embodiment as Image Display Device]

Finally, an embodiment as an image display device will be described. The present invention provides, as an embodiment, an image display device of which a short side of a subpixel size is d μm and which includes a glass plate disposed on an image display side of the image display device, the glass plate being the glass plate described in at least one of the above first to fourth embodiments. However, the average dimension of the minute deformed portions on the glass plate is preferably set in a range of 3.2 μm or greater and $(d/1.9)$ μm or smaller, or particularly 4 μm or greater and $(d/2)$ μm or smaller.

[Glass Plate]

The composition of the glass plate is not particularly limited. Glass plates having various compositions such as soda lime glass, aluminosilicate glass, and alkali-free glass, may be employed. The thickness of the glass plate is not particularly limited, but is, for example, in a range of 0.1 mm to 4.0 mm or particularly 0.5 mm to 3.0 mm.

[Working of Glass Plate]

(Strengthening Treatment)

The glass plate may be subjected to a physical strengthening treatment or a chemical strengthening treatment, as necessary. It suffices to perform such a treatment by a conventionally used method, and therefore the description thereof is omitted here.

(Thin Film Formation)

On a surface of the glass plate, a thin film for adding a certain function may be formed as necessary. The thin film may be formed on the main surface 1 on which the minute deformed portions 2 are disposed, or may be formed on a main surface on the opposite side. Examples of the thin film are a reflection suppressing film, a fingerprint adhesion preventing film, and the like. It suffices to form such a thin film by a conventionally used method, and therefore the description thereof is omitted here. The thin film is typically formed by a vapor phase film formation method such as vacuum deposition, sputtering, or chemical vapor deposition, or a wet film formation method such as a sol-gel method.

Hereinafter, the present invention will be described in more detail using Examples. The following Examples are not intended to limit the present invention.

[Manufacturing of Glass Plates]

Minute recesses/projections or minute deformed portions were formed on main surfaces of glass plates as follows. The used glass plates were aluminosilicate glass having a thickness of 1.1 mm. Various kinds of minute recesses/projections were formed on main surfaces on one side of the glass plates by photolithography. As an etchant used for etching performed subsequent to development and washing of a photomask, hydrofluoric acid (hydrogen fluoride solution) having a concentration of 1.5 wt % was used. The etching was performed so that the depths of formed recesses or the heights of formed projections were approximately 0.3 to 0.6 μm.

A glass plate in Example 18 was manufactured by sandblasting and etching using hydrofluoric acid, without photolithography.

[Evaluation of Glass Plates]

Evaluation of Glass Plates was Conducted as Follows.

(Dimensions and Area Ratio of Minute Deformed Portions)

Using an SEM, main surfaces of the minute deformed portions were observed over a range of 126×95 μm, to measure the area ratio and the dimensions of the minute deformed portions. The dimensions of the minute deformed portions were measured for 84 minute deformed portions.

(Gloss and Haze)

Gloss was measured on the basis of "Method 3 (60-degree specular gloss)" of "Specular glossiness-Methods of measurement" in JIS Z8741-1997. Haze was measured on the basis of JIS K7136: 2000.

(Number of FT Bright Spots)

Image processing software "Imagej 1.50i" was used for measurement of the number of bright spots on a 2-dimensional Fourier transform image. This software is in the public domain and has a Fourier analysis function. Specifically, a threshold was set so that the minute deformed portions were discriminated from the surrounding region on the image obtained by SEM observation, a Fourier transform image was generated, and then the number of bright spots appearing on the Fourier transform image was counted. The above analysis by the software was basically performed with a gradation of 256×256 (binarization processing A), and in a case described later, was performed with a gradation of 65536×65536 (binarization processing B).

(Sparkle Suppression Effect)

On each of surfaces of displays of 125 ppi and 326 ppi in which the gradation indication (R, G, B) was set at (0, 255, 0) so that only a green subpixel emitted light, the glass plate was placed such that the main surface on which the minute recesses/projections were formed faced outward of the display, and flickering of an image was evaluated with the display at rest. The result was evaluated on the basis of the following.

X: Flickering can be confirmed on the screen.

Δ: Flickering can be slightly confirmed on the screen.

◯: Flickering cannot be confirmed on the screen.

(Reflection Unevenness)

A fluorescent light of 20 W was placed above an examination table having a black surface, and the glass plate was retained at about 30 cm below the fluorescent light. In this state, surface reflection on the main surface of the glass plate was observed from a position distant by about 30 cm from the glass plate. The result was evaluated on the basis of the following.

X: Rainbow interference color can be confirmed.

◯: Interference color can be slightly confirmed.

⊚: Interference color cannot be confirmed.

Figure 23:
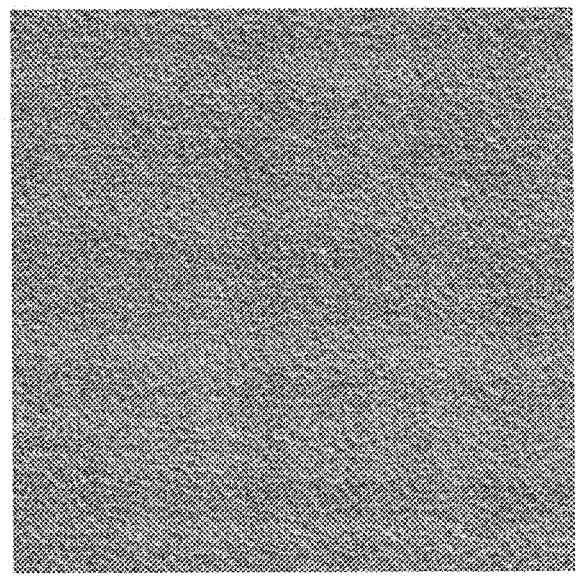
FIG. 23 shows an image obtained by observing a main surface of a glass plate in Example 18 by the SEM, and an FT image obtained from that image.
Figure 23:
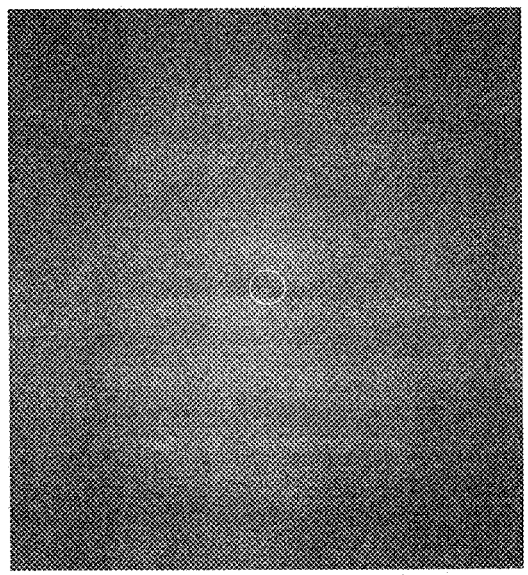

The results are shown in Tables 1 and 2. In addition, results of observing the main surfaces of the glass plates obtained in Examples 1 to 18 using an SEM are shown in FIGS. 6 to 23. The SEM images are images obtained by observing 50 μm square regions (FIGS. 6 to 12; Examples 1 to 7), 200 μm square regions (FIGS. 13 to 22; Examples 8 to 17), and a 100 μm square region (FIG. 23; Example 18). In addition, 2-dimensional Fourier transform images obtained from the obtained SEM images are shown together in FIGS. 13 to 23. Bright spots on the transform image are at positions enclosed by circle marks. In Examples 1 to 7, at least more than 100 bright spots were confirmed through measurement of the 50 μm square region, and therefore measurement for the 200 μm square region in which the number of bright spots would further increase was omitted. In Example 18, a 2-dimensional Fourier transform image for the 200 μm square region was also observed, but the number of bright spots was only one, as in FIG. 23. Although not shown, also in Examples 19 to 35, minute deformed portions were formed on the main surfaces of the glass plates.

Regarding SEM images in FIG. 1 and FIG. 2 in Patent Literature 2, 2-dimensional Fourier transform images were generated in the same manner as described above, and as a result, the number of bright spots was one as in Example 18. In any of the conventional antiglare glasses, periodicity of minute deformed portions in a plane direction on a main surface could not be confirmed.

Figure 24:
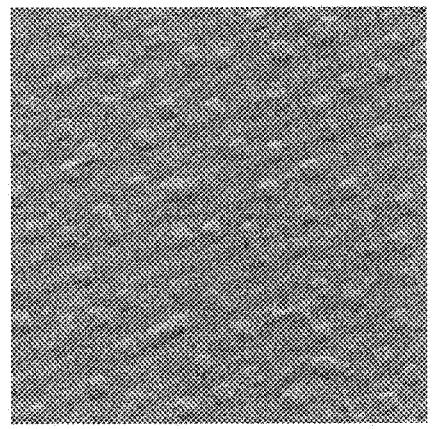
FIG. 24 shows an image obtained by observing a 200 μm square on a main surface of a glass plate obtained in the same manner as in Example 22, by the SEM.
Figure 25:
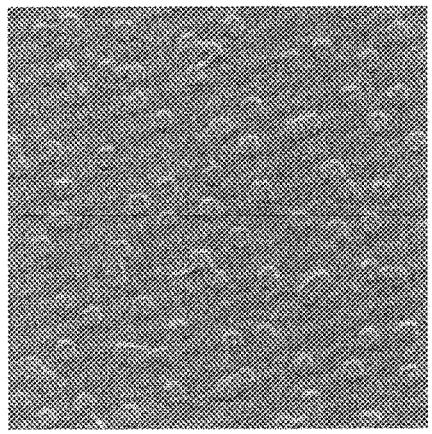
FIG. 25 shows an image obtained by observing a 200 μm square on a main surface of a glass plate obtained in the same manner as in Example 27, by the SEM.

When glass plates designed so that the number of bright spots were relatively decreased, specifically, became 15 or less, or further 10 or less, were repetitively manufactured, there were cases where the number of bright spots became smaller than values indicated in Table 1 and 2, depending on the manufacturing lot, and a sample in which the number of bright spots was one, was also confirmed. Results of observation using an SEM for such samples are shown in FIGS. 24 and 25. FIGS. 24 and 25 show results obtained from samples obtained by applying the same manufacturing condition as in Examples 22 and 27, respectively. Regarding the items in Table 2 except for the number of bright spots, favorable results that were almost the same as in Examples 22 and 27 were respectively obtained also from the above samples. In addition, for the samples shown in FIGS. 24 and 25, the analysis by the software was performed with a higher gradation, specifically, with a gradation of 8192×8192 or higher, and the number of FT bright spots was counted. As a result, two or more bright spots appeared in each sample. Also in Examples 32 to 35, the number of FT bright spots based on the binarization processing A was one, but when the analysis by the software was performed with a higher gradation, specifically, with a gradation of 65536×65536 (binarization processing B), the number of FT bright spots was two or more. On the other hand, when the sample of Example 18 was analyzed with a similar high gradation, the number of bright spots was still one.

Further, a tactile test on the main surface of the glass plate was conducted for Examples 13 and 14 which were almost the same in the area ratio of the minute deformed portions and were different in the shape (recess or projection) of the minute deformed portions. This test was conducted by rubbing the main surface with a dry finger about five times. Example 14 in which the minute deformed portions were projections exhibited a more favorable tactile feeling than Example 13. The same tactile test was conducted also for the other glass plates, and thus it could be confirmed that, if the area ratio was in the same range, the glass plate in which the minute deformed portions were projections exhibited a more favorable tactile feeling than the glass plate in which the minute deformed portions were recesses.

In addition, a surface roughness curve was measured using a cross-section SEM for the continuous portion in Examples 1 to 17, and from this curve, a mean roughness was calculated for a part corresponding to the continuous portion by the same formula as for the arithmetic mean roughness Ra. As a result, the value of the mean roughness was 0.008 μm or smaller in all of Examples 1 to 17. In addition, a mean roughness was calculated in the same manner for the top of a projection or the bottom of a recess which was the minute deformed portion in Examples 1 to 17. As a result, the value of the mean roughness was 0.008 μm or smaller in all of Examples 1 to 17. The same measurement was conducted also for Examples 19 to 35 and as a result, the mean roughness was similarly low.

Figure 26:
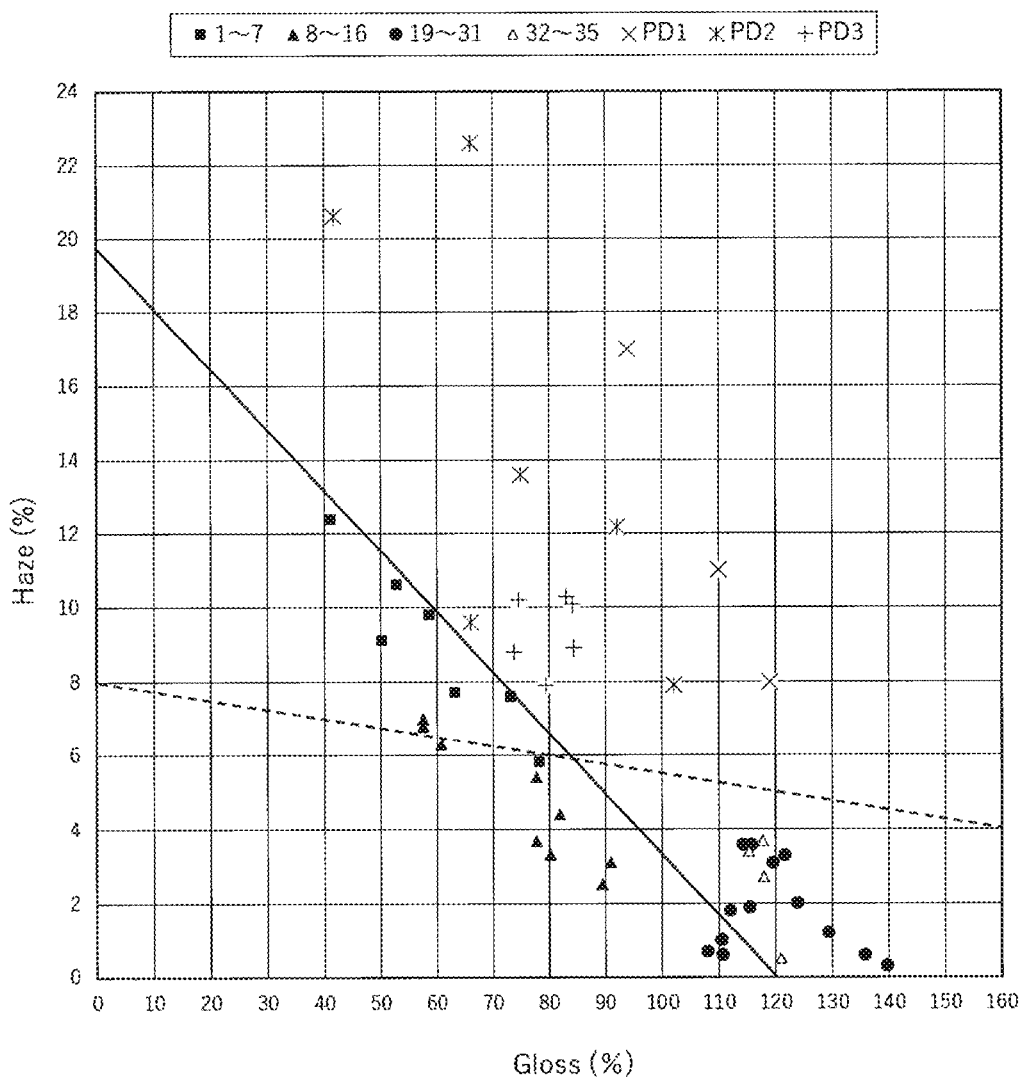
FIG. 26 shows a relationship between gloss and haze of glass plates in Examples 1 to 35 and Examples of Patent Literature 1 to 3.

FIG. 26 shows a relationship between gloss and haze in Examples 1 to 16 and 19 to 35. Where gloss is denoted by X (%) and haze is denoted by Y (%), a solid oblique line shown in FIG. 26 is represented by $Y=-\frac{1}{6}X+20$. The properties of the glass plates in Examples 1 to 16 in Table 1 are plotted under the solid oblique line in FIG. 26, more specifically, between the above oblique line and an oblique line represented by $Y=-\frac{1}{6}X+15$, which is not shown in FIG. 26. In particular, in the glass plates in Examples 1 to 6, the average value of the dimensions was 3.2 μm to 13.6 μm, and sparkle was suppressed in combination with the image display device having a pixel density of 326 ppi, while gloss and haze were reduced in a well-balanced manner as compared to the conventional case.

In Examples 19 to 35, haze is sufficiently reduced, but gloss is slightly high and the relationship of $Y \leq -\frac{1}{6}X+20$ is not established except for Examples 22, 25, 27. However, it was confirmed that properties that were not problematic in practice were obtained also in these samples. In particular, in the glass plates in Examples 19 to 35, sparkle was suppressed in combination with the image display device having a pixel density of 326 ppi, haze was sufficiently reduced, and reflection unevenness was also favorably suppressed. A broken oblique line shown in FIG. 26 is represented by $Y=-\frac{1}{40}X+8$. Properties of the glass plates in Examples 19 to 35 are plotted under the broken oblique line in FIG. 26.

PD1 to PD3 plotted in FIG. 26 indicate properties of glass plates disclosed as Examples in which sparkle could be suppressed in Patent Literature 1 to 3, respectively. The glass plates in Examples in Patent Literature 1 to 3 suppressed sparkle in combination with the image display device having a pixel density of 326 ppi, but did not succeed in reducing both of gloss and haze to be small. In the technologies in Patent Literature 1 to 3, as presented in Comparative Examples in Patent Literature 1 to 3, gloss and haze cannot be appropriately set unless occurrence of sparkle is permitted. It is considered that, in the glass plates in Examples in Patent Literature 1 to 3, properties were slightly poorer because the ratio of minute deformed portions having dimensions of about 3 μm or smaller was high. With the conventional technologies disclosed in Patent Literature 1 to 3, it is difficult to form minute deformed portions having appropriate dimensions while suppressing variations in the dimensions.

In the conventional antiglare glass as shown in Patent Literature 1 to 3, the shapes and arrangement of the minute recesses/projections formed on the main surface are not controlled. Therefore, the property thereof might be greatly changed due to a slight difference in the manufacturing condition. For example, in a glass plate (gloss 66%, haze 9.6%) indicated by * closest to the solid oblique line in FIG. 26, gloss and haze are both greatly increased merely by shortening the time of etching by five seconds (gloss 75%, haze 13.6%; see Examples 8 and 9 in Patent Literature 2).

With reference to Examples 1 to 4, 6, and 7 in Table 1, the coefficients of variation (standard deviation/average value) of the dimensions, calculated from the examples in which the standard deviations of the dimensions were measured, were all sufficiently small at about 2.8 to 2.9%. In Example 5, there were two kinds of minute deformed portions α, β which were clearly different in dimensions and were discriminable from each other (the minimum dimension of the minute deformed portions α was greater than the maximum dimension of the minute deformed portions β by 2 μm or more), and the coefficients of variation of the dimensions calculated for the respective kinds of minute deformed portions were both about 2.8 to 2.9%.

Also in Examples 8 and 9 in which the minute deformed portions appeared to be randomly arranged, it could be confirmed that there was periodicity in the arrangement thereof through judgement performed for a region that included a considerable number of the minute deformed portions. In both of Examples 8 and 9, 130 to 140 minute deformed portions were present in a 200 μm square region, and the number of FT bright spots corresponding thereto was five. On the other hand, the number of FT bright spots obtained from a 100 μm square region that included about ¼ of the above minute deformed portions, was only one in both of Examples 8 and 9, as in the conventional random minute deformed portions. In determination for periodicity of the minute deformed portions based on the number of FT bright spots, it is desirable to set a region so as to include 80 to 150 minute deformed portions, in order to ensure accuracy. Such setting of the region based on the number is considered to be particularly effective for a main surface on which the average shortest distance between the minute deformed portions is greater than in the examples shown in the drawings, and the distribution density of the minute deformed portions is smaller than in the examples shown in the drawings.

With reference to Examples 8 to 10, 12, 13, and 15 in Table 1 and Examples 19 to 35 in Table 2, the coefficient of variation is in a range of 3 to 35% and thus variations are slightly great. Even when variations were recognized to this extent in the dimensions of the minute deformed portions, effects such as the sparkle suppression effect were sufficiently obtained. In addition, the coefficient of variation that is great to this extent was effective for suppressing reflection unevenness. In Examples 5, 11, 14, and 16, there were minute deformed portions that were clearly different in dimensions and were discriminable from each other, and for each kind of the minute deformed portions, variations in the dimensions thereof were small. As in Example 5, also in Examples 11, 14, and 16, the coefficient of variation in the dimensions of the minute deformed portions for each of discriminable kinds was 23% or less, as far as confirmation was made. In Example 32, variations in the dimensions of the minute deformed portions are suppressed to be extremely small. Also in such a glass plate, if regularity of arrangement of the minute deformed portions is reduced (the number of FT bright spots based on binarization processing A: 1), reflection unevenness is improved to a certain extent.

On the other hand, in Example 17, the average dimension of the minute deformed portions was greater than 40 μm, and the sparkle suppression effect was not obtained. In Example 18, the average dimension of the minute deformed portions was about 2 μm. In Example 18, unlike Examples 1 to 17 and 19 to 35, there were a large number of minute deformed portions having dimensions of 0.5 to 3.0 μm, and transmitting light was significantly clouded in white. Also in a point that the minute deformed portions were not surrounded by a substantially flat region and the minute deformed portions were formed almost over the entirety of the main surface, Example 18 was different from other Examples in which such a region was present and the area ratio of the minute deformed portions was 50% or less (see FIGS. 6 to 25).

TABLE 1

| | | Minute deformed portion | | | | Sparkle suppression effect | | | | |
|---|---|---|---|---|---|---|---|---|---|---|
| Example | Shape | Average dimension (μm) | Area ratio (%) | Average shortest distance (μm) | Number of FT bright spots | 125 ppi | 326 ppi | Gloss (%) | Haze (%) | Reflection unevenness |
| 1 | R | 6.0 (0.17/2.8%) | 22 | 16.7 | Many | ○ | ○ | 78.3 | 5.8 | X |
| 2 | R | 6.0 (0.17/2.8%) | 34 | 11.8 | Many | ○ | ○ | 63.3 | 7.7 | X |
| 3 | P | 9.5 (0.17/1.8%) | 29 | 11.8 | Many | ○ | ○ | 73.2 | 7.6 | X |
| 4 | R | 8.3 (0.24/2.9%) | 50 | 10.4 | Many | ○ | ○ | 41.1 | 12.4 | X |
| 5 | R | 8.3 (0.28/3.4%) (0.20/2.9%) | 29 | 12.5 | Many | ○ | ○ | 58.7 | 9.8 | X |
| 6 | R | 10.7 (0.31/2.9%) | 45 | 15.8 | Many | ○ | ○ | 52.8 | 10.6 | X |
| 7 | P | 14.3 (0.41/2.9%) | 45 | 13.4 | Many | ○ | X | 50.2 | 9.1 | X |
| 8 | P | 17.0 (2.31/13.6%) | 30 | 17.1 | 5 | ○ | X | 77.7 | 5.4 | ○ |
| 9 | R | 17.0 (2.74/16.1%) | 30 | 17.2 | 5 | ○ | X | 57.5 | 7.0 | ○ |
| 10 | P | 30.2 (4.9/16.2%) | 30 | 33.8 | 9 | ○ | X | 91.0 | 3.1 | ○ |
| 11 | R | 32.6 | 30 | 40.8 | 9 | ○ | X | 89.4 | 2.5 | ○ |
| 12 | R | 27.9 (2.05/7.3%) | 30 | 29.8 | 11 | ○ | X | 80.2 | 3.3 | ○ |
| 13 | R | 25.6 (5.90/23.0%) | 30 | 18.7 | 15 | ○ | X | 60.7 | 6.3 | ◎ |
| 14 | P | 32.6 | 30 | 28.9 | 17 | ○ | X | 81.9 | 4.4 | ◎ |
| 15 | R | 27.9 (1.40/5.0%) | 30 | 28.6 | 21 | ○ | X | 77.8 | 3.7 | ○ |
| 16 | P | 34.9 | 40 | 20.3 | 21 | ○ | X | 57.5 | 6.8 | ○ |
| 17* | P | 41.9 (3.29/7.9%) | 30 | 40.8 | 7 | X | X | 101.2 | 2.1 | ○ |
| 18* | — | 1.9 (0.47/24.7%) | — | 1.2 | 1 (1) | — | — | — | — | — |

P: Projections, R: Recesses
Numerical values indicated in parentheses together with the average dimension are a standard deviation (left) and a coefficient of variation (right) of the dimensions.
The standard deviations and the coefficients of variation of the dimensions in Example 5 are indicated for the respective two kinds of minute deformed portions discriminable from each other, in order from the relatively larger kind of minute deformed portions (average dimension: 9.6 μm); the coefficient of variation of all the minute deformed portions in Example 5 is 16.0%.
In Examples 1 to 17, there were no minute deformed portions A1 having dimensions of 0.5 to 3.0 μm.
Examples 17 and 18 are Comparative Examples; in Example 18, transmitting light was significantly clouded in white and thus the properties were not measured.
"Many" for the number of bright spots indicates a number at least larger than 100.
The number of FT bright spots is a number based on the binarization processing A.
The number of FT bright spots in Example 18 was one even when the binarization processing B was applied (in parentheses).

TABLE 2

| | | Minute deformed portion | | | | Sparkle suppression effect | | | | |
|---|---|---|---|---|---|---|---|---|---|---|
| Example | Shape | Average dimension (μm) | Area ratio (%) | Average shortest distance (μm) | Number of FT bright spots | 125 ppi | 326 ppi | Gloss (%) | Haze (%) | Reflection unevenness |
| 19 | P | 10.6 (0.94/8.8%) | 21 | 21.5 | 9 | ○ | ○ | 121.6 | 3.3 | ○ |
| 20 | P | 10.6 (1.06/10.0%) | 21 | 21.5 | 9 | ○ | ○ | 115.3 | 1.9 | ○ |
| 21 | P | 10.9 (1.28/11.8%) | 21 | 21.5 | 9 | ○ | ○ | 115.8 | 3.6 | ○ |
| 22 | P | 11.0 (1.33/12.0%) | 21 | 21.5 | 9 | ○ | ○ | 108.1 | 0.7 | ○ |
| 23 | P | 10.8 (1.37/12.7%) | 21 | 21.5 | 9 | ○ | Δ | 114.3 | 3.6 | ◎ |
| 24 | P | 11.0 (1.40/12.8%) | 21 | 21.5 | 9 | ○ | Δ | 111.9 | 1.8 | ◎ |
| 25 | P | 10.9 (1.48/13.6%) | 21 | 21.5 | 9 | ○ | Δ | 110.6 | 0.6 | ◎ |
| 26 | P | 11.4 (1.93/16.9%) | 21 | 21.5 | 5 | ○ | Δ | 119.5 | 3.1 | ◎ |
| 27 | P | 10.5 (1.92/18.3%) | 21 | 21.5 | 5 | ○ | Δ | 110.5 | 1.0 | ◎ |
| 28 | P | 10.0 (1.53/15.3%) | 31 | 18.0 | 25 | ○ | ○ | 123.8 | 2.0 | ○ |
| 29 | P | 9.9 (1.91/19.3%) | 21 | 21.5 | 5 | ○ | Δ | 129.3 | 1.2 | ◎ |
| 30 | P | 9.8 (2.05/20.9%) | 15 | 25.8 | 7 | ○ | ○ | 135.8 | 0.6 | ◎ |
| 31 | P | 10.1 (1.24/12.3%) | 9 | 33.3 | 13 | ○ | ○ | 139.7 | 0.3 | ◎ |
| 32 | P | 10.0 (<0.005/<0.05%) | 21 | 21.5 | 1 (≥2) | ○ | ○ | 115.3 | 3.4 | ○ |
| 33 | P | 12.0 (4.19/34.8%) | 21 | 21.5 | 1 (≥2) | ○ | ○ | 117.8 | 3.7 | ◎ |

TABLE 2-continued

| | | Minute deformed portion | | | | Sparkle suppression effect | | | | |
| | | Average | Area ratio | Average shortest | Number of FT bright | | | Gloss | Haze | Reflection |
| Example | Shape | dimension (μm) | (%) | distance (μm) | spots | 125 ppi | 326 ppi | (%) | (%) | unevenness |
|---|---|---|---|---|---|---|---|---|---|---|
| 34 | P | 10.2 (3.01/29.4%) | 17 | 21.5 | 1 (≥2) | ○ | ○ | 120.9 | 0.5 | ◎ |
| 35 | P | 10.2 (3.07/30.0%) | 17 | 21.5 | 1 (≥2) | ○ | ○ | 117.9 | 2.7 | ◎ |

P: Projections
Numerical values indicated in parentheses together with the average dimension are a standard deviation (left) and a coefficient of variation (right) of the dimensions.
In Examples 19 to 35, there were no minute deformed portions A1 having dimensions of 0.5 to 3.0 μm.
The number of FT bright spots is a number based on the binarization processing A.
The number of FT bright spots in Examples 32 to 35 was two or more when the binarization processing B was applied as indicated in parentheses.

In Table 1, in Examples 1 to 16, the ratio of the minute deformed portions A2 having dimensions of 0.5 μm to 3.6 μm in terms of number is less than 3%. In Examples 7 to 16, the ratio of the minute deformed portions A3 having dimensions of 0.5 μm to 4.0 μm in terms of number is less than 3%. In Examples 10 to 16, the ratio of the minute deformed portions A4 having dimensions of 0.5 μm to 5.3 μm in terms of number is less than 3%. In Examples 10, 11, and 14 to 16, the ratio of the minute deformed portions A5 having dimensions of 0.5 μm to 6.5 μm in terms of number is less than 3%. In Table 2, in Examples 19 to 35, the ratio of the minute deformed portions A2 having dimensions of 0.5 μm to 3.6 μm in terms of number is less than 3%. In Examples 23 to 35, the ratio of the minute deformed portions A3 having dimensions of 0.5 μm to 4.0 μm in terms of number is less than 3%. In Examples 28 to 35, the ratio of the minute deformed portions A4 having dimensions of 0.5 μm to 5.3 μm in terms of number is less than 3%. In Examples 30 to 35, the ratio of the minute deformed portions A5 having dimensions of 0.5 μm to 6.5 μm in terms of number is less than 3%. In Examples 1 to 10, 12, 13, 15, 16, and 18 to 35, the ratio of the minute deformed portions B having dimensions greater than 35.5 μm in terms of number is less than 15%.

Using the photolithography-etching as described in the above Examples, it is possible to manufacture glass having favorable performance with high reproducibility. This manufacturing method is also suitable for greatly reducing variations and a fault rate among products.

INDUSTRIAL APPLICABILITY

The glass plate according to the present invention is particularly highly useful as glass having an antiglare function disposed on the image display side of an image display device.

The invention claimed is:
1. A glass plate comprising a main surface having a plurality of minute deformed portions, wherein
the plurality of minute deformed portions are a plurality of recesses or a plurality of projections,
where an average value of lengths of two sides adjacent to each other of a minimum quadrilateral with four right angles surrounding each minute deformed portion as observed from a direction perpendicular to the main surface is defined as a dimension of the minute deformed portion, and an average value of the dimensions of the plurality of minute deformed portions is 3.2 μm to 35.5 μm,
at least one of the following conditions is satisfied:
a condition a1 that a ratio of minute deformed portions A1 having the dimensions of 0.5 μm to 3.0 μm with respect to the plurality of minute deformed portions in terms of number is less than 5%; and
a condition d1 that a coefficient of variation of the dimensions of the plurality of minute deformed portions is 40% or less, and
3 to 30 bright spots are observed on a 2-dimensional Fourier transform image of a processed image having been subjected to binarization processing A for discriminating the plurality of minute deformed portions from their surrounding region in a 200 μm square region on the main surface observed from the above direction, or one bright spot is observed on the 2-dimensional Fourier transform image of the processed image having been subjected to the binarization processing A and two or more bright spots are observed on a 2-dimensional Fourier transform image of a processed image having been subjected to binarization processing B instead of the binarization processing A,
where the binarization processing A is binarization processing performed with an image divided into pixels of 256×256, and the binarization processing B is binarization processing performed with an image divided into pixels of 65536×65536.
2. The glass plate according to claim 1, wherein
the plurality of minute deformed portions are a plurality of recesses.
3. The glass plate according to claim 1, wherein
the plurality of minute deformed portions are a plurality of projections.
4. The glass plate according to claim 1, wherein
where gloss is denoted by X (%) and haze is denoted by Y (%), and at least one of relational expressions Y≤−⅙X+20 and Y≤−¹⁄₄₀X+8 is satisfied.
5. The glass plate according to claim 4, wherein Y≤−¹⁄₄₀X+8 is satisfied.
6. The glass plate according to claim 1, wherein
a condition b that a ratio of minute deformed portions B having the dimensions greater than 35.5 μm with respect to the plurality of minute deformed portions in terms of number is less than 15%, is satisfied.
7. The glass plate according to claim 1, wherein
the coefficient of variation of the dimensions of the plurality of minute deformed portions is 23% or less.
8. The glass plate according to claim 1, wherein
as observed from the direction, the plurality of minute deformed portions include a first minute deformed portion corresponding to i) a minute deformed portion having a straight section contacting a receding portion of the quadrilateral, wherein the receding portion recedes from a part that is selected from sides of the quadrilateral and does not include a vertex of the quadrilateral, or ii) a minute deformed portion which is a polygon of which at least one internal angle is a reflex angle, and a second minute deformed portion having a shape different from the first minute deformed portion.

9. The glass plate according to claim 8, wherein
the shape of the second minute deformed portion corresponds to neither the i) nor the ii).

10. The glass plate according to claim 1, wherein
the average value of the dimensions of the plurality of minute deformed portions is 3.2 μm or greater and 13.6 μm or smaller.

11. The glass plate according to claim 1, wherein
the average value of the dimensions of the plurality of minute deformed portions is 7 μm or greater and 13.6 μm or smaller.

\* \* \* \* \*